(12) United States Patent
Shitamoto

(10) Patent No.: US 9,898,009 B2
(45) Date of Patent: Feb. 20, 2018

(54) AUTONOMOUS TRAVEL VEHICLE

(71) Applicant: MURATA MACHINERY, LTD., Kyoto-shi, Kyoto (JP)

(72) Inventor: Hideo Shitamoto, Kyoto (JP)

(73) Assignee: MURATA MACHINERY, LTD., Kyoto (JP)

(*) Notice: Subject to any disclaimer, the term of this patent is extended or adjusted under 35 U.S.C. 154(b) by 57 days.

(21) Appl. No.: 15/119,792

(22) PCT Filed: Feb. 6, 2015

(86) PCT No.: PCT/JP2015/053330
§ 371 (c)(1),
(2) Date: Aug. 18, 2016

(87) PCT Pub. No.: WO2015/129425
PCT Pub. Date: Sep. 3, 2015

(65) Prior Publication Data
US 2017/0060137 A1    Mar. 2, 2017

(30) Foreign Application Priority Data
Feb. 25, 2014 (JP) ................................. 2014-033983

(51) Int. Cl.
G05D 1/02 (2006.01)
G05D 1/00 (2006.01)

(52) U.S. Cl.
CPC ......... G05D 1/0274 (2013.01); G05D 1/0016 (2013.01); G05D 1/0088 (2013.01);
(Continued)

(58) Field of Classification Search
CPC .. G05D 1/0274; G05D 1/0016; G05D 1/0088; G05D 1/0221; G05D 1/024; G05D 2201/02
(Continued)

(56) References Cited

U.S. PATENT DOCUMENTS 8,520,695 B1 * 8/2013 Rubin ...................... G08G 9/02
370/337
8,892,251 B1 * 11/2014 Dooley ............... A47L 11/4011
700/245
(Continued)

FOREIGN PATENT DOCUMENTS

JP    02-120908 A    5/1990
JP    08-326025 A    12/1996
(Continued)

OTHER PUBLICATIONS

Official Communication issued in corresponding International Application PCT/JP2015/053330, dated Dec. 22, 2015.
(Continued)

Primary Examiner — Anne M Antonucci
Assistant Examiner — James E Stroud
(74) Attorney, Agent, or Firm — Keating & Bennett, LLP

(57) ABSTRACT

An autonomous travel vehicle includes a platform, a traveler, a storage, an arrival position predictor, a corrected speed calculator, and a reproduction travel command calculator. The traveler controls the platform to travel in accordance with a travel control command. The storage stores travel route data, which stores subgoal points, arrival times, and traveling speeds in association with each other. In the reproduction travel mode, the arrival position predictor predicts a predicted arrival position. In the reproduction travel mode, the corrected speed calculator calculates a corrected traveling speed based on a predicted traveling distance and a required traveling distance. The reproduction travel command calculator calculates a reproduction travel control command based on the corrected traveling speed, as the travel control command.

13 Claims, 20 Drawing Sheets

Front direction

(52) U.S. Cl.
CPC ........... *G05D 1/024* (2013.01); *G05D 1/0221* (2013.01); *G05D 2201/02* (2013.01)

(58) Field of Classification Search
USPC .......................................................... 701/26
See application file for complete search history.

(56) References Cited

U.S. PATENT DOCUMENTS

| | | | | |
|---|---|---|---|---|
| 2010/0017046 | A1* | 1/2010 | Cheung | ................... G01S 7/003 701/2 |
| 2011/0166836 | A1* | 7/2011 | Kaplan | ................ G08G 5/0043 703/2 |
| 2014/0046585 | A1* | 2/2014 | Morris, IV | ............. G01C 21/00 701/468 |
| 2014/0083556 | A1* | 3/2014 | Darr | ..................... A01D 43/073 141/1 |
| 2014/0247116 | A1* | 9/2014 | Davidson | ............. G06Q 10/087 340/10.1 |

FOREIGN PATENT DOCUMENTS

| | | |
|---|---|---|
| JP | 2004-362022 A | 12/2004 |
| JP | 4433618 B2 | 3/2010 |
| JP | 2013-226905 A | 11/2013 |

OTHER PUBLICATIONS

Official Communication issued in International Patent Application No. PCT/JP2015/053330, dated Apr. 21, 2015.

* cited by examiner

AUTONOMOUS TRAVEL VEHICLE

BACKGROUND OF THE INVENTION

1. Field of the Invention

The present invention relates to an autonomous travel vehicle that autonomously travels while reproducing a specified travel route.

2. Description of the Related Art

There has been known travel vehicles and robots that autonomously travel while reproducing a travel route taught by an operator. For instance, JP-A-8-326025 discloses a cleaning robot. The cleaning robot includes a casing equipped with the following means: travel drive means for traveling on a floor surface, position detection means for detecting a position of the casing on the floor surface, cleaning means for cleaning the floor surface, operation receiving means for receiving operation inputs for the travel drive means and the cleaning means, storage means for storing a travel route based on positions detected by the position detection means in association with received content of the operation receiving means, and control means for reading stored content stored in the storage means so as to control the travel drive means and the cleaning means based on the stored content.

In addition, JP-A-2004-362022 discloses a plurality of moving bodies that move in a file. Each of the moving bodies is taught about track data chronologically indicating time points and positions of the moving body at the time points, and the time points and the positions at the time points are stored. In this way, the moving body can move such that the moving body exists at a position indicated in the track data at a time point indicated in the track data.

However, due to a measurement error of position detection means or the like as well as slipping, there may be errors between the stored position information as well as the time point associated with the position information and actual position information as well as an actual time point. In this case, when the robot or the moving body autonomously travels, a position of the robot or the moving body at the stored time point may deviate from the position stored in the storage means. As a result, a work or the like having a concept of time cannot be assuredly reproduced. In other words, the taught travel route cannot be assuredly reproduced.

SUMMARY OF THE INVENTION

Preferred embodiments of the present invention provide an autonomous travel vehicle that assuredly reproduces and travels a planned travel route even if travel route data has an error.

A plurality of preferred embodiments of the present invention are described herein and can be arbitrarily combined as necessary.

An autonomous travel vehicle according to one aspect of various preferred embodiments of the present invention includes a platform, a traveler, a storage, an arrival position predictor, a corrected speed calculator, and a reproduction travel command calculator. The traveler controls the platform to travel in accordance with a travel control command. The storage stores travel route data. The travel route data includes a plurality of subgoal points set on a planned travel route, associated arrival times at which the autonomous travel vehicle reaches each of the plurality of subgoal points, and associated traveling speeds of the platform, respectively, at the plurality of subgoal points. The arrival position predictor predicts a predicted arrival position of the platform based on the traveling speed and the arrival time when the reproduction travel mode is executed. The reproduction travel mode is a travel mode in which the autonomous travel vehicle autonomously travels along the travel route based on the travel route data.

The corrected speed calculator calculates the corrected traveling speed based on a predicted traveling distance and a required traveling distance, when the reproduction travel mode is executed. The predicted traveling distance is a distance between a current position of the platform and the predicted arrival position. The required traveling distance is a traveling distance necessary to reach an arrival target subgoal point. The arrival target subgoal point is a subgoal point corresponding to a target point to be reached by the platform. The corrected traveling speed is a corrected speed of the traveling speed. The reproduction travel command calculator calculates a reproduction travel control command based on the corrected traveling speed as the travel control command, when the reproduction travel mode is executed.

In the autonomous travel vehicle described above, when the autonomous travel vehicle autonomously travels based on the travel route data (when the reproduction travel mode is executed), the arrival position predictor first predicts the predicted arrival position. Next, the corrected speed calculator calculates the predicted traveling distance from the predicted arrival position and the current position. In addition, the corrected speed calculator calculates the required traveling distance necessary to reach the arrival target subgoal point. Then, the corrected speed calculator calculates the corrected traveling speed based on the predicted traveling distance and the required traveling distance. Further, the reproduction travel command calculator calculates the reproduction travel control command based on the corrected traveling speed, so as to set the reproduction travel control command as the travel control command. Further, the traveler controls the platform to travel based on the travel control command calculated based on the corrected traveling speed (the reproduction travel control command).

In the autonomous travel vehicle described above, the travel route data includes not only the plurality of subgoal points set on the travel route but also the associated arrival times when the subgoal points are respectively reached and the associated traveling speeds respectively at the subgoal points. In this way, the autonomous travel vehicle is able to reproduce and travel the travel route while reproducing operations having a concept of time.

In addition, in the autonomous travel vehicle described above, the (arrival) traveling speed stored and included in the travel route data is corrected based on the predicted traveling distance and the required traveling distance, when the reproduction travel mode is executed. In this way, even if the travel route data has an error due to a measurement error, the error of the travel route data is able to be corrected in accordance with the actual traveling. As a result, the autonomous travel vehicle is able to travel while assuredly reproducing the travel route.

The required traveling distance may be a distance between the current position and the arrival target subgoal point.

In this case, even if the current position deviates from the subgoal point corresponding to the current position stored and included in the travel route data, and/or if the predicted arrival position deviates from a position corresponding to the arrival target subgoal point, the deviation is reduced before reaching the next target point (the arrival target subgoal point).

The autonomous travel vehicle may further include an elapsed autonomous travel time counter. The elapsed autonomous travel time counter counts elapsed autonomous travel time from a start of the reproduction travel mode.

In this case, the required traveling distance may be a distance between a current subgoal point and the arrival target subgoal point. The current subgoal point is a subgoal point associated with an arrival time corresponding to the elapsed autonomous travel time.

In this way, even if the subgoal point, the arrival time, and the traveling speed stored and included in the travel route data do not appropriately correspond to each other, the autonomous travel vehicle is able to travel while assuredly reproducing the taught travel route.

The traveler may include a pair of main wheels disposed to face each other on the left and right sides in the travel direction of the platform. In this case, the pair of main wheels may be capable of rotating independently of each other. In addition, each of a first traveling speed and a second traveling speed, being speeds of the pair of main wheels, include a parallel speed component and a turning speed component. The parallel speed component is a speed that determines a center speed of the platform (the autonomous travel vehicle). The turning speed component is a speed that determines turning of the platform (the autonomous travel vehicle).

Further, in this case, the corrected speed calculator calculates a corrected parallel speed component and a corrected turning speed component as the corrected traveling speed. The corrected parallel speed component is a corrected speed of the parallel speed component. In addition, the corrected turning speed component is a corrected speed of the turning speed component.

The corrected speed calculator may further calculate the corrected parallel speed component including a travel route correction speed component based on a travel route error. The travel route error indicates a deviation between the travel route and the platform. The travel route correction speed component is a correction speed to join the travel route.

In this way, if the autonomous travel vehicle is at a position deviating from the travel route, the autonomous travel vehicle is able to turn and join the travel route based on the travel route error. As a result, the autonomous travel vehicle is able to autonomously join the travel route.

The travel route error may be a distance between a virtual travel route and the current position. The virtual travel route is a travel route expressed by a straight line connecting the current subgoal point and the arrival target subgoal point. In this way, the travel route correction speed component is able to be calculated by a simpler calculation.

The arrival position predictor may further predict a straight arrival prediction point. The straight arrival prediction point is a position of the platform that is predicted to be reached by traveling straight from the current position.

In this case, the travel route error may be a distance between the virtual travel route and the straight arrival prediction point. In this way, if the autonomous travel vehicle is at a position deviating from the travel route, the autonomous travel vehicle is able to join the travel route in a quicker manner.

The corrected parallel speed component may be divided into a first parallel speed component and a second parallel speed component at a predetermined ratio. In this case, the travel route correction speed component may be calculated by using the second parallel speed component. In this way, the travel route correction speed component is able to be calculated without the first traveling speed and/or the second traveling speed being the maximum speed or higher or being the minimum speed or lower.

A first travel route correction speed component may be calculated as the product of the second parallel speed component and a first constant. In this case, the first constant is determined by a function that monotonically increases within a range of 0 to 1 along with an increase of the travel route error. In addition, the first travel route correction speed component is the travel route correction speed component for the first traveling speed.

The second travel route correction speed component may be calculated as the product of the second parallel speed component and a second constant. In this case, the second constant is determined by a difference between 1 and the first constant. In addition, the second travel route correction speed component is the travel route correction speed component for the second traveling speed.

In this way, if the autonomous travel vehicle is at a position deviating from the travel route, and if the autonomous travel vehicle autonomously joins the travel route, it is possible to determine the turning for joining the travel route based on the travel route error and on which side of the travel route the platform (the autonomous travel vehicle) exists.

The travel route data may further include direction angles in association respectively with a plurality of subgoal points. The direction angle is an angle indicating a direction of the platform at each of the plurality of subgoal points. In this way, an operation of the platform (the autonomous travel vehicle) that causes a change of the direction is able to be stored and included in the travel route data.

The arrival position predictor may further predict a predicted direction angle. The predicted direction angle is an angle indicating a direction at the predicted arrival position.

In this case, the corrected speed calculator may calculate the corrected turning speed component based on a target direction angle change and a predicted direction angle change. The target direction angle change is an direction angle change necessary to turn to an arrival target direction angle. The arrival target direction angle is a direction angle associated with the arrival target subgoal point. The predicted direction angle change is a difference between the predicted direction angle and a current direction angle. The current direction angle is a direction angle indicating a direction of the platform at the current position.

In this way, when the autonomous travel vehicle travels along the travel route while changing its direction, autonomous travel vehicle is able to assuredly reproduce and travel the travel route while assuredly reproducing its direction.

The travel route data may further include travel curvature radii in association respectively with the subgoal points. The travel curvature radius is a curvature radius for the platform (the autonomous travel vehicle) when it is to pass each of the subgoal points. In this case, the turning speed component may be calculated based on the traveling speed corresponding to the parallel speed component and the travel curvature radius.

In this way, when the reproduction travel mode is executed, it is not necessary to calculate the travel curvature radius.

The autonomous travel vehicle may further include an elapsed teaching time counter, and a taught data generator. The elapsed teaching time counter counts an elapsed teaching time when a manual operation teaching mode is executed. The manual operation teaching mode is a travel mode in which the travel route is taught via an operation of an operator. The elapsed teaching time is a time from start of the manual operation teaching mode.

When the manual operation teaching mode is executed, the taught data generator generates the travel route data. The travel route data includes the taught subgoal points and the associated elapsed teaching times when the taught subgoal points are obtained. In this way, the taught travel route by the operation of the operator is able to be stored and included in the travel route data so as to contain a concept of time.

Autonomous travel vehicles according to preferred embodiments of the present invention assuredly reproduce and travel a planned travel route even if travel route data includes an error.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
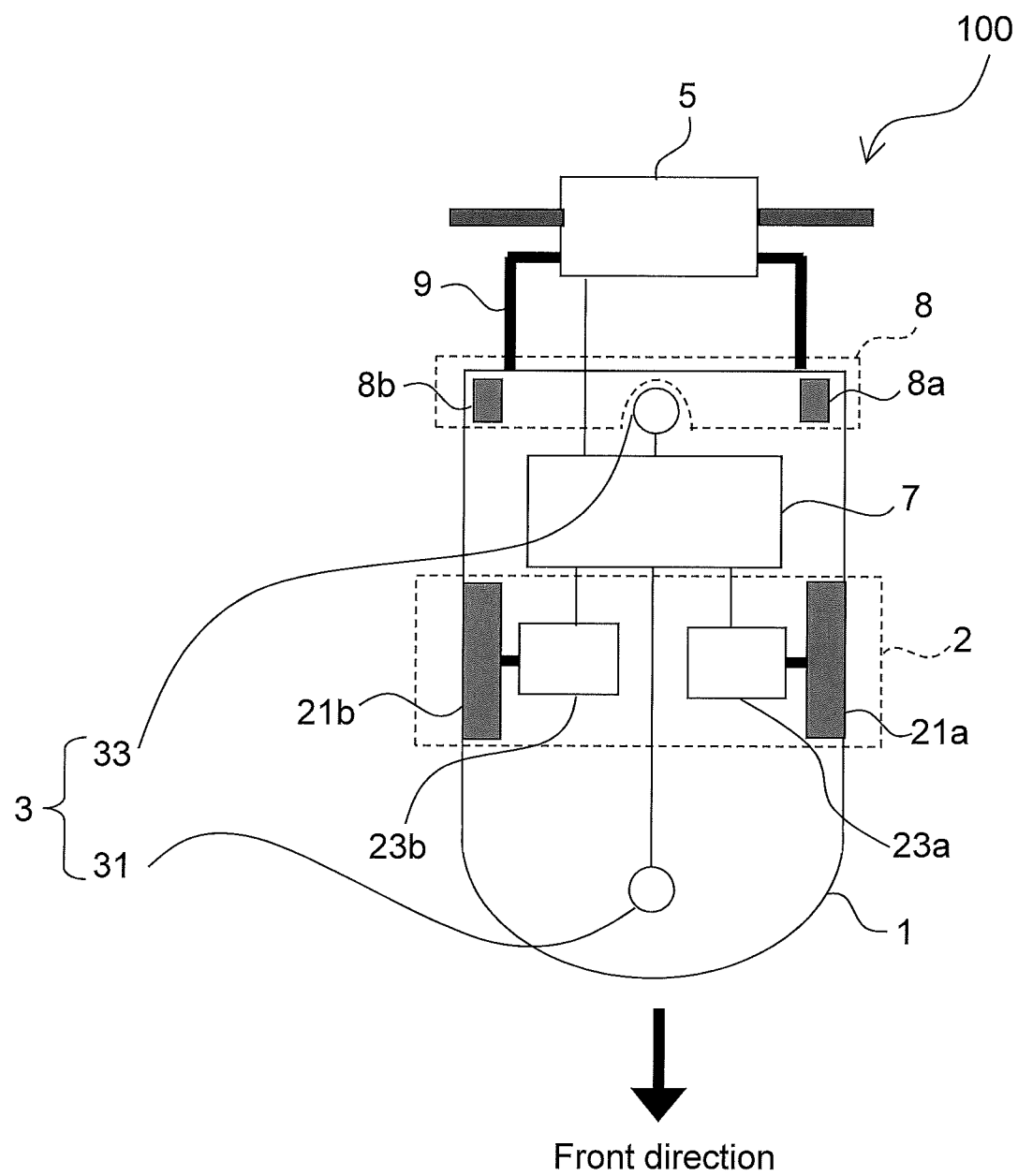
FIG. 1 is a diagram illustrating an overall structure of an autonomous travel vehicle.

First, an overall structure of an autonomous travel vehicle 100 according to a first preferred embodiment of the present invention is described with reference to FIG. 1. FIG. 1 is a diagram illustrating an overall structure of the autonomous travel vehicle 100. The autonomous travel vehicle 100 of this preferred embodiment illustrated in FIG. 1 is an autonomous travel vehicle in which an operation by an operator is taught to the autonomous travel vehicle 100, so that the autonomous travel vehicle 100 reproduces the operation taught by the operator (including a taught travel route and an operation having a concept of time). The autonomous travel vehicle 100 includes a platform 1, a traveler 2, a detector 3, an operation interface 5, and a controller 7.

The platform 1 is a main body of the autonomous travel vehicle 100. The traveler 2 is provided to the platform 1. The traveler 2 travels in accordance with a travel control command (described later) so that the platform 1 travels. The detector 3 detects an obstacle (a traveling obstacle) and a wall and the like on the travel route, so as to output position information of an obstacle, a wall, and the like to the controller 7.

The operation interface 5 is fixed to the upper rear side of the platform 1 via an attachment member 9. The operation interface 5 is operated by an operator when the operator teaches a travel route by operating the autonomous travel vehicle 100 (when a manual operation teaching mode is executed). The operation using the operation interface 5 is output to the controller 7, and as a result, when the manual operation teaching mode is executed, the autonomous travel vehicle 100 is controlled based on the operation of the operation interface 5 by the operator. In addition, with the operation interface 5, various settings of the autonomous travel vehicle 100 are able to be input.

The controller 7 is electrically connected to motors 23a and 23b of the traveler 2 (described later), so as to supply a drive power to control the motors. In addition, the controller 7 is able to input signals from the detector 3 and obtains the position information of an obstacle, a wall, and the like based on the signal.

Further, the controller 7 obtains a position of the autonomous travel vehicle 100 on a movement plane (a travel environment) based on the position information of an obstacle, a wall, and the like. In addition, the controller 7 may detect a traveling obstacle that is on the travel route or may (is predicted to) enter the travel route so as to hinder the traveling, based on the signal obtained from the detector 3.

The detailed structures of the traveler 2, the detector 3, the operation interface 5, and the controller 7 of the autonomous travel vehicle 100 will be described later.

The autonomous travel vehicle 100 further includes an auxiliary wheel structure 8. The auxiliary wheel structure 8 includes two auxiliary wheels 8a and 8b. The two auxiliary wheels 8a and 8b are attached to the rear bottom portion of the platform in a manner capable of independently rotating. With the auxiliary wheel structure 8, the autonomous travel vehicle 100 is able to stably and smoothly travel.

Next, a structure of the traveler 2 is described in detail with reference to FIG. 1. The traveler 2 of this preferred embodiment illustrated in FIG. 1 is a traveler called an "opposed two-wheel differential type" traveler. Accordingly, the traveler 2 includes a pair of main wheels 21a and 21b and two motors 23a and 23b. The main wheels 21a and 21b are disposed on the bottom portion substantially in the middle of the platform 1, so as to face each other on the left and right sides of the platform 1 in the travel direction.

In addition, the main wheels 21a and 21b are connected to output rotation shafts of the motors 23a and 23b, respectively, whose rotation speed is able to be controlled independently of each other by the controller 7. Accordingly, the main wheels 21a and 21b are able to rotate at arbitrary rotation speed independently of each other.

Note that an electric motor such as a servo motor and/or a brushless motor can be used, for example, as the motors 23a and 23b.

With the structure described above, the traveler 2 is able to change (turn) the travel direction of the platform 1 (the autonomous travel vehicle 100) by differentiating between the rotation speed of the main wheel 21a and the rotation speed of the main wheel 21b. In addition, by setting the same rotation speed for the main wheel 21a and the main wheel 21b, the platform 1 is able to travel straight.

Next, a structure of the detector 3 is described with reference to FIG. 1. The detector 3 includes a front detector 31 and a rear detector 33. The front detector 31 detects an obstacle, a wall, and the like in front of the autonomous travel vehicle 100. The rear detector 33 detects an obstacle, a wall, and the like behind the autonomous travel vehicle 100. In addition, each of the front detector 31 and the rear detector 33 outputs a signal including information about a distance between the autonomous travel vehicle 100 and the obstacle, the wall, or the like and a direction of the obstacle, the wall, or the like viewed from the autonomous travel vehicle 100. In this way, the detector 3 is able to output relative position information of the obstacle, the wall, or the like viewed from the autonomous travel vehicle 100 to the controller 7.

A laser range finder (LRF) or the like having a detection range of at least about 180 degrees and a detection distance of at least about 4 meters can be used, for example, as the front detector 31 and the rear detector 33 of the detector 3.

Figure 2:
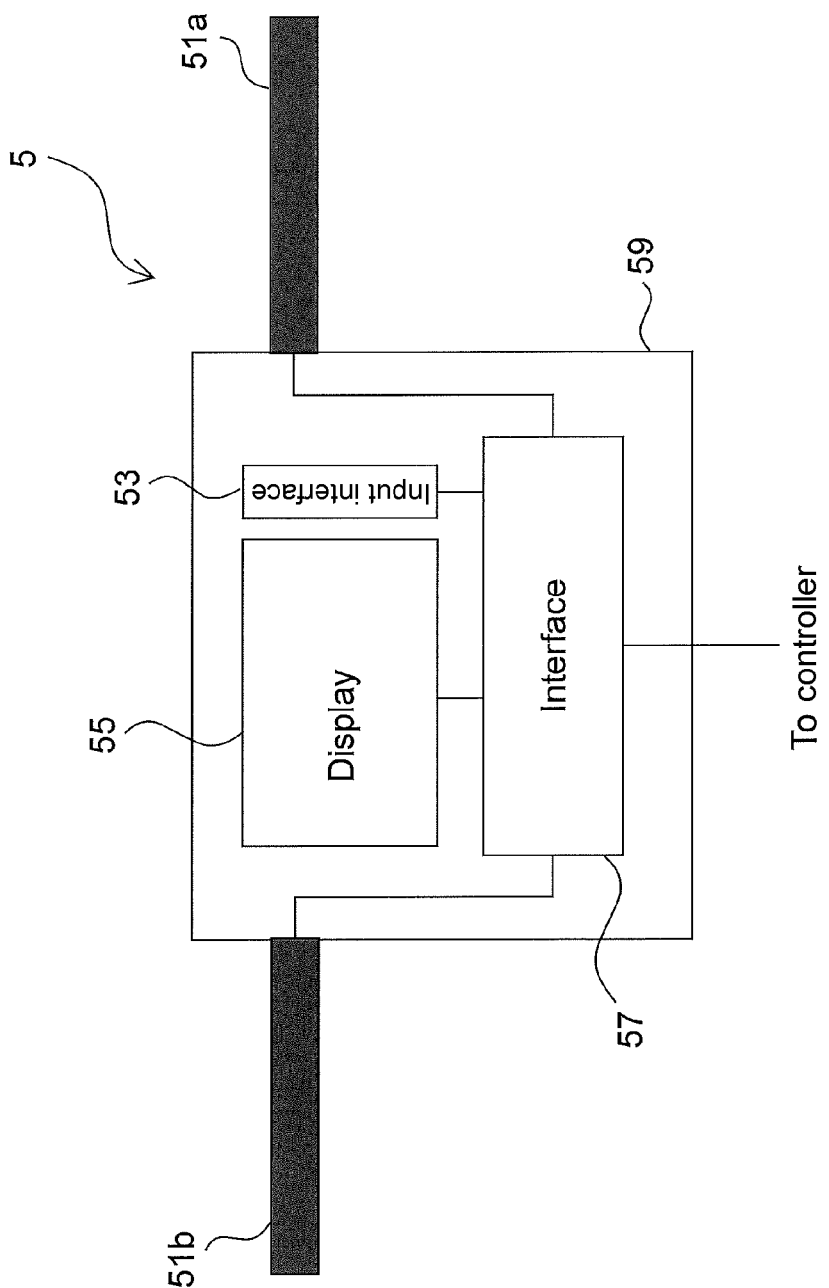
FIG. 2 is a diagram illustrating a structure of an operation interface.

Next, a structure of the operation interface 5 is described with reference to FIG. 2. FIG. 2 is a diagram illustrating a structure of the operation interface 5. The operation interface 5 includes operation handles 51a and 51b, an input interface 53, a display 55, an interface 57, and a casing 59.

The operation handles 51a and 51b are attached respectively to the left and right of the casing 59 in a rotatable manner. Rotation amounts (operation amounts) and rotation directions of the operation handles 51a and 51b are converted into electric signals by the interface 57 and are input to the controller 7.

In addition, it is acceptable that the operation handle 51a is an input interface that instructs a traveling speed in the traveling direction, and the operation handle 51b is an input interface that instructs a steering angle. In this way, when the manual operation teaching mode is executed, the operator operates the operation handles 51a and 51b so as to control the autonomous travel vehicle 100 to travel along a desired travel route.

The input interface 53 switches the travel mode of the autonomous travel vehicle 100 to either a reproduction travel mode or the manual operation teaching mode. The travel mode set by the input interface 53 is output to a switch 77 of the controller 7 (FIG. 3) via the interface 57. In addition, the input interface may be capable of making other various settings of the autonomous travel vehicle 100.

The input interface 53 may preferably include, for example, switches and/or a keyboard that make various settings of the travel mode and the like of the autonomous travel vehicle 100. Alternatively, the input interface 53 may preferably include a touch panel and may be formed integrally with the display 55.

The display 55 reads and displays information such as various settings of the autonomous travel vehicle 100 from the controller 7 via the interface 57. As the display 55, a display such as a liquid crystal display can be used. In addition, if the input interface 53 and the display 55 are integrally formed as described above, a display with a touch panel function can be used as the display 55 (and the input interface 53).

The interface 57 converts the rotation amounts and the rotation directions of the operation handles 51a and 51b, switch and/or key inputs of the input interface 53, and the like into electric signals and outputs the electric signals to the controller 7. In addition, the interface 57 reads information about the autonomous travel vehicle 100 from the controller 7 in accordance with an operator's instruction or the like, and outputs the information to the display 55.

Accordingly, a microcomputer can be used as the interface 57. The microcomputer includes, for example, a signal converter that converts the rotation amounts and the rotation directions of the operation handles 51a and 51b and a set state of the input interface 53 into electric signals, display driving circuitry that displays information on the display 55, and a communication interface to transmit and receive signals to and from the controller 7.

Figure 3:
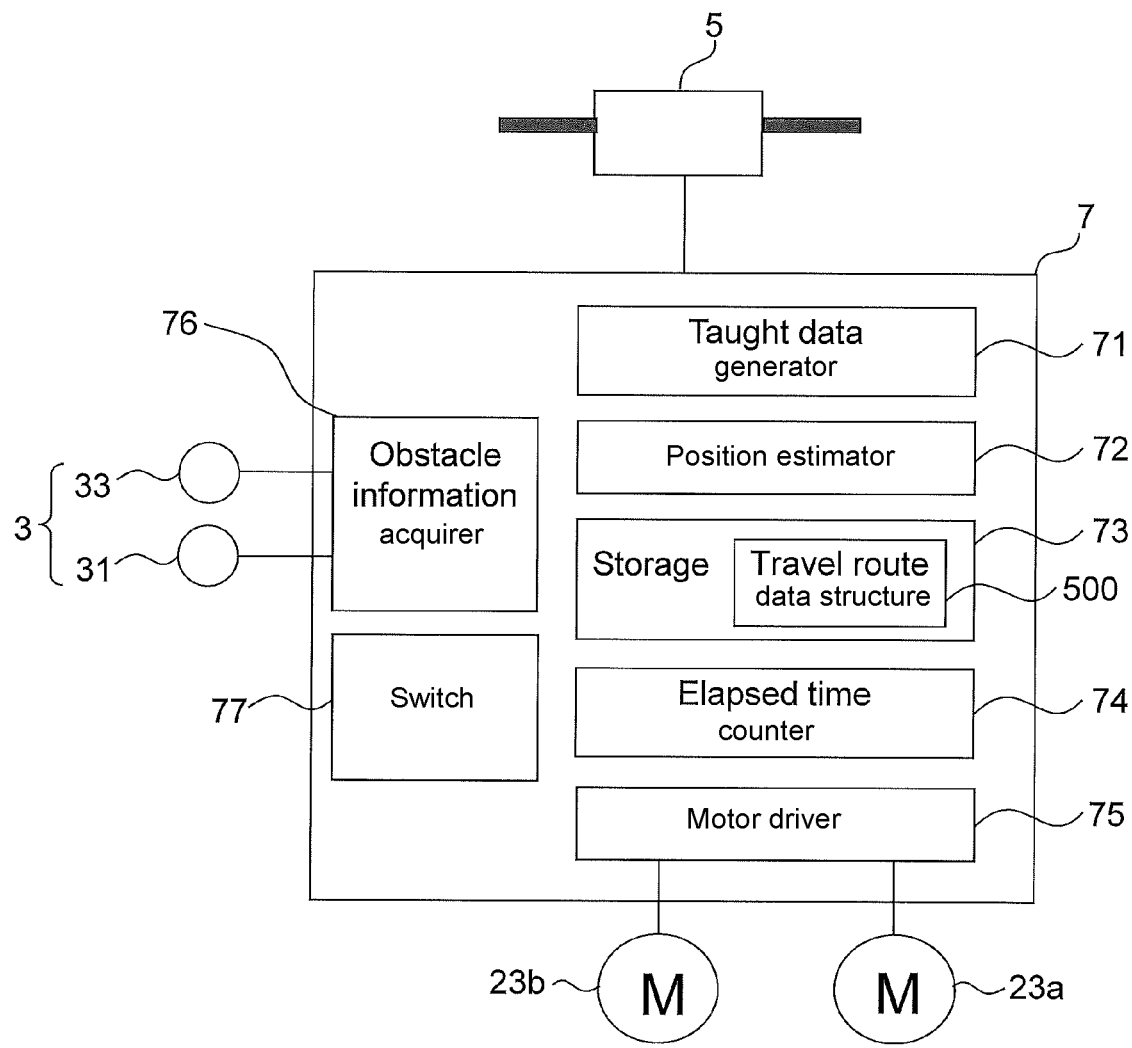
FIG. 3 is a diagram illustrating an overall structure of a controller.

Next, an overall structure of the controller 7 is described with reference to FIG. 3. FIG. 3 is a diagram illustrating an overall structure of the controller.

Note that the controller 7 may be defined by or include a microcomputer system or the like, which includes a central processing unit (CPU), a storage device including a hard disk drive, a read only memory (ROM), a random access memory (RAM), a storage medium reader, and the like, and an interface that performs signal conversions.

In addition, a portion or all of the functions of individual units or portions of the controller 7 described below may be realized in a program. Further, the program may be stored in the storage device of the microcomputer. Alternatively, a portion or all of functions of individual units of the controller 7 may be realized using a custom IC or the like.

The controller 7 includes a taught data generator 71, a position estimator 72, a storage 73, an elapsed time counter 74, a motor driver 75, an obstacle information acquirer 76, and the switch 77.

The taught data generator 71 obtains information about positions every predetermined time, the positions that the autonomous travel vehicle 100 passes when the operator operates the autonomous travel vehicle 100 using the operation interface 5, when the manual operation teaching mode is executed. Then, the taught data generator 71 converts the information about positions into coordinate values on a coordinate system expressing the movement plane on which the autonomous travel vehicle 100 travels (hereinafter referred to as a movement coordinate system). Further, the taught data generator 71 stores, in the storage 73 (described later), the information about positions after the coordinate conversion and the elapsed teaching times when the information about positions are obtained, in association with each other.

Here, the information about positions described above indicates target points to be passed set on the planned travel route. Accordingly, the information about positions described above is referred to as "subgoal points".

In addition, when the manual operation teaching mode is executed, the taught data generator 71 continues to obtain the subgoal point from a travel start position of the autonomous travel vehicle 100 until the operator stops the autonomous travel vehicle 100 (until the end of the manual operation teaching mode or until reaching a travel end position). As a result, the taught data generator 71 can store, in the storage 73, an aggregate of a plurality of the subgoal points (taught subgoal points) on the (planned) travel route passed by an operation by the operator. The plurality of the subgoal points (taught subgoal points) are obtained from the travel start position to the travel end position. The taught data generator 71 is also able to store an aggregate of associated elapsed teaching times (arrival times (described later)) when the plurality of subgoal points (the taught subgoal points) are obtained.

In this way, by obtaining and storing, as a set of coordinate values (the subgoal points), the positions that the autonomous travel vehicle 100 passes via an operation of an operator when the manual operation teaching mode is executed, the travel route of the autonomous travel vehicle 100 taught via the operation of the operator is able to be stored in the storage 73. Accordingly, the data, which includes the aggregate of the subgoal points obtained by the taught data generator 71 and the aggregate of the elapsed teaching times associated respectively with the plurality of subgoal points, is referred to as "travel route data". In addition, the elapsed teaching time associated with each of the plurality of subgoal points is referred to as an "arrival time".

Figure 11A:
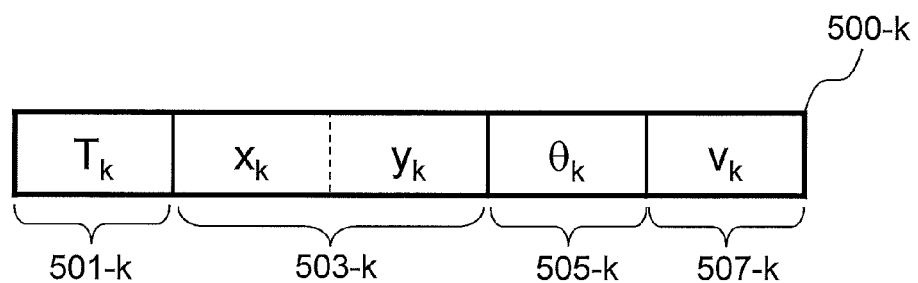
FIG. 11A is a diagram illustrating an example of a travel route data structure.
Figure 11B:
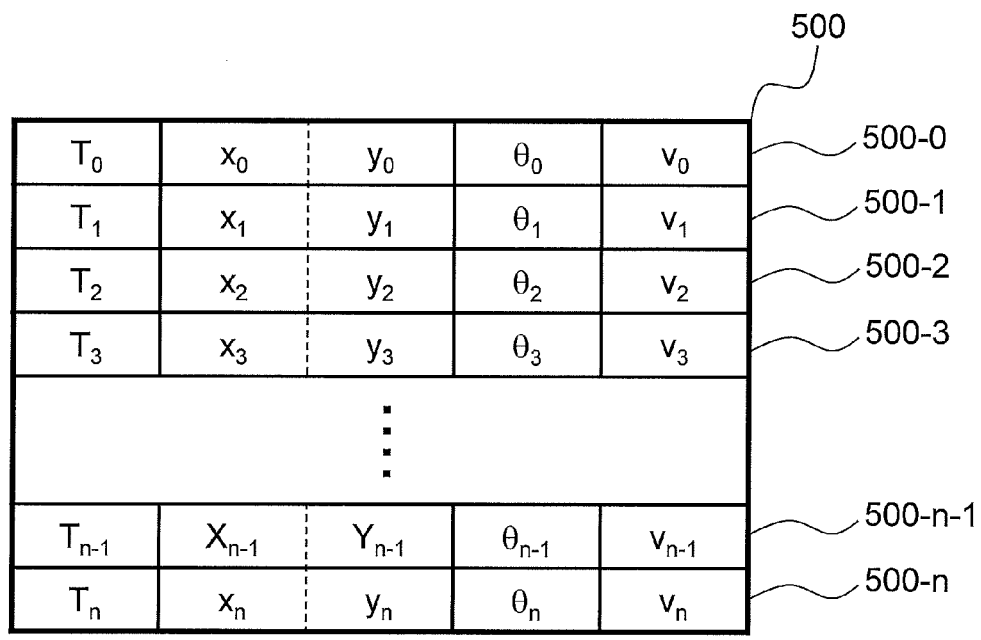
FIG. 11B is a diagram illustrating an example of the travel route data.
Figure 11C:
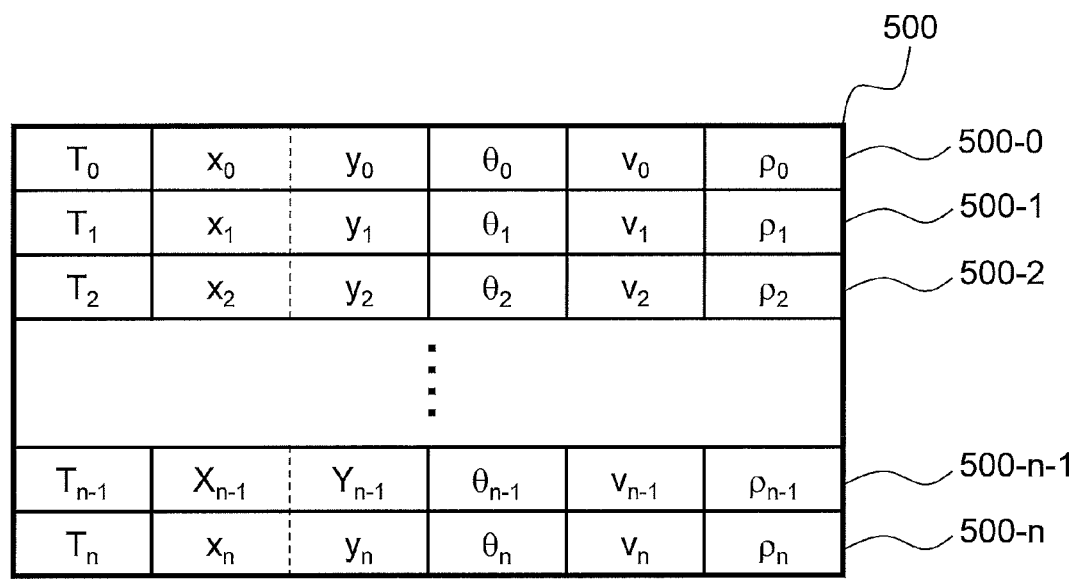
FIG. 11C is a diagram illustrating travel route data storing a travel curvature radius.

Note that the storage 73 stores travel route data 500 as illustrated in FIG. 3. The details of the travel route data 500 are illustrated in FIGS. 11B and 11C (as described later).

Due to the fact that the travel route data 500 includes the arrival times when the autonomous travel vehicle 100 reaches the (taught) subgoal points in association with the subgoal points, an operation having a concept of time such as stopping for a constant time is able to be stored and included in the travel route data 500. Further, due to the fact that the autonomous travel vehicle 100 assuredly reproduces and travels the travel route data 500 when the reproduction travel mode is executed, the travel route indicated in the travel route data 500 is able to be assuredly reproduced while the operation having a concept of time is able to be assuredly reproduced.

In addition, when the taught data generator 71 obtains the subgoal point, it further obtains a speed of the autonomous travel vehicle 100 (traveling speed) at the subgoal point, and the traveling speed and the subgoal point are stored in association with each other in the storage 73. In this case, the travel route data 500 may include an aggregate of the subgoal points, an aggregate of the arrival times, and an aggregate of the traveling speeds.

In this way, because the travel route data 500 includes the traveling speeds respectively at the subgoal points in association respectively with the subgoal points, when the manual operation teaching mode is executed, the actual speeds of the autonomous travel vehicle 100 when the travel route is taught are able to be stored in the travel route data 500. As a result, it is possible to reproduce a travel such as traveling slowly in a certain section between subgoal points (or in a certain period of time).

Note that the traveling speed as a speed of the autonomous travel vehicle 100 at the taught subgoal point is calculated based on an operation travel control command (described later) calculated from the rotation amounts and/or the rotation directions of the operation interface 5, for example. Alternatively, the traveling speed is also able to be calculated from the rotation amounts per unit time of the motors 23a and 23b or the main wheels 21a and 21b. Further, it is possible to calculate the traveling speed from a variation per unit time of the position of the autonomous travel vehicle 100 estimated by the position estimator 72 (described later).

Further, when the taught data generator 71 obtains the subgoal point, it obtains and stores in the storage 73 information about a direction of the platform 1 (the autonomous travel vehicle 100) at the subgoal point. In this case, the travel route data 500 includes information about directions of the platform 1 (the autonomous travel vehicle 100) in association respectively with the subgoal points.

In this way, an operation of the platform 1 (the autonomous travel vehicle 100) with change of the direction of the autonomous travel vehicle 100 is able to be stored and included in the travel route data 500.

Figure 4:
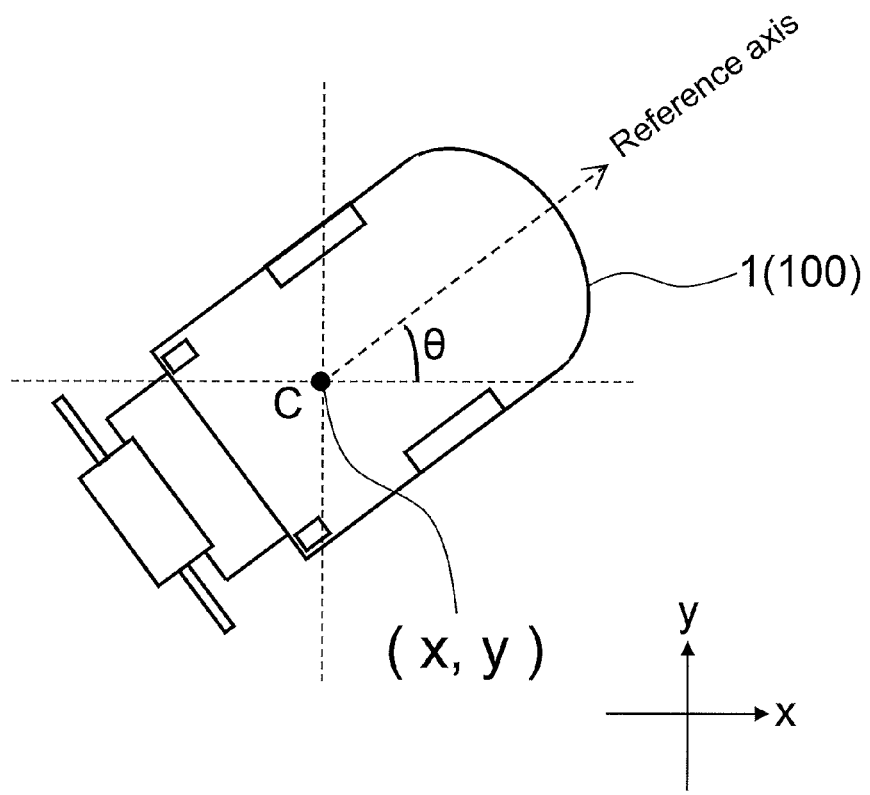
FIG. 4 is a diagram illustrating a definition of a direction angle of a platform (an autonomous travel vehicle).

Here, the direction of the autonomous travel vehicle 100 is defined, for example, as a direction angle $\theta$ illustrated in FIG. 4, which is an angle between a reference axis extending from a center C of the platform 1 (the autonomous travel vehicle 100) to the front of the platform 1 and an x axis of a movement coordinate system. In addition, in this preferred embodiment, the direction angle $\theta$ increases in a counterclockwise direction in FIG. 4. FIG. 4 is a diagram illustrating the definition of the direction angle of the platform (the autonomous travel vehicle).

In addition, when the taught data generator 71 obtains the subgoal point, a curvature radius (travel curvature radius $\rho$) when the platform 1 (the autonomous travel vehicle 100) passes the subgoal point is stored in association with the subgoal point. In this way, when the reproduction travel mode is executed, it is not necessary to calculate the travel curvature radius $\rho$.

As described later, the travel curvature radius $\rho$ when passing the subgoal point is calculated, for example, as a radius of a circle defined by the subgoal point for which the travel curvature radius ρ should be calculated and other (three or more) subgoal points apart from the subgoal point by a predetermined distance.

By selecting the subgoal points apart from the subgoal point by a predetermined distance as the other subgoal points, even if the measured (estimated) position when the subgoal point is obtained has an error (noise component), the appropriate travel curvature radius ρ in which the noise component is reduced is able to be obtained.

The position estimator 72 estimates a position of the platform 1 (the autonomous travel vehicle 100) in the travel environment (on the movement plane) at each predetermined time. The position estimator 72 is able to, for example, estimate the position of the autonomous travel vehicle 100 on the movement plane using a simultaneous localization and mapping (SLAM) method or the like.

In addition, the position estimator 72 converts the relative position information of the obstacle, the wall, or the like viewed from the autonomous travel vehicle 100 obtained by the detector 3 into coordinate values on the movement coordinate system. Further, the position estimator 72 generates map information on the movement plane around the autonomous travel vehicle 100 (referred to as a local map), based on the position information of an obstacle, a wall, and the like detected by the front detector 31 and the rear detector 33 of the detector 3.

Further, the position estimator 72 stores map information of the movement plane (referred to as an environment map) in the storage 73. Then, the position estimator 72 compares the environment map with the local map so as to estimate a position on the movement plane at which the autonomous travel vehicle 100 exists.

In addition, the position estimator 72 is also able to estimate the position of the autonomous travel vehicle 100 based on the rotation speeds of the motors 23a and 23b (dead reckoning). Accordingly, each of output rotation shafts of the motors 23a and 23b is provided with a device that measures the rotation speed of the output rotation shaft. In this preferred embodiment, encoders 231a and 231b (FIG. 6) are attached to the output rotation shafts of the motors 23a and 23b, respectively.

With the structure described above, by combining the position estimation using the signal obtained from the detector 3 with the position estimation based on the rotation speeds of the motors 23a and 23b, the position estimator 72 is able to complement the results of the these position estimations with each other. As a result, more accurate position estimation is able to be made compared with the position estimation based on only the detector 3 or only the rotation speeds of the motors 23a and 23b.

In the case where the controller 7 is realized by a microcomputer system, the storage 73 corresponds to a storage device of the microcomputer system (or a portion of a storage area of the storage device). The storage 73 stores information such as various settings of the autonomous travel vehicle 100, the travel route data 500, and position information of an obstacle (traveling obstacle), a wall, and the like. In addition, if a portion or the entirety of functions of the individual units or functional portions of the controller 7 are realized by software, the storage 73 may store the software.

The elapsed time counter 74 counts various elapsed times used in the autonomous travel vehicle 100. In this preferred embodiment, as the elapsed time, there are an elapsed autonomous travel time (described later) and an elapsed teaching time. The elapsed autonomous travel time is a time counted during the execution of the reproduction travel mode of the autonomous travel vehicle 100, and is an elapsed time from start of the reproduction travel mode (from a time point when the execution of the reproduction travel mode is started). On the other hand, the elapsed teaching time is a time counted during the execution of the manual operation teaching mode of the autonomous travel vehicle 100, and is an (elapsed) time from start of the manual operation teaching mode (from a time point when the execution of the manual operation teaching mode is started).

The detailed structure and operation of the elapsed time counter 74 will be described later.

The motor driver 75 is connected to the motors 23a and 23b and supplies drive current to the motors 23a and 23b so as to control the motors.

The motor driver 75 is connected to the operation interface 5 in a manner capable of transmitting and receiving signals. When the manual operation teaching mode is executed, the motor driver 75 generates the operation travel control command based on the rotation amounts and/or the rotation directions of the operation handles 51a and 51b of the operation interface 5. Further, the motor driver 75 controls the motors 23a and 23b by using the operation travel control command as the travel control command.

On the other hand, when the reproduction travel mode is executed, the motor driver 75 generates the reproduction travel control command based on the travel route data 500 stored in the storage 73. Further, the motor driver 75 controls the motors 23a and 23b by using the reproduction travel control command as the travel control command.

In addition, when the reproduction travel mode is executed, the motor driver 75 calculates a speed (corrected traveling speed) by correcting the traveling speed based on the traveling speed (the taught speed) stored and included in the travel route data 500. Further, the motor driver 75 calculates the reproduction travel control command based on the corrected traveling speed and outputs the calculated reproduction travel control command to the motors 23a and 23b as the travel control command.

In this way, the platform 1 (the autonomous travel vehicle 100) is able to travel while assuredly reproducing the taught travel route. The detailed structure and operation of the motor driver 75 will be described later.

The obstacle information acquirer 76 is connected to the front detector 31 and the rear detector 33 of the detector 3 in a manner capable of transmitting and receiving signals. The obstacle information acquirer 76 obtains position information of an obstacle, a wall, and the like based on the signals output from the front detector 31 and the rear detector 33. Further, the obstacle information acquirer 76 stores the position information of an obstacle, a wall, and the like in the storage 73 as necessary. In this case, the obstacle information acquirer 76 may output the position information of an obstacle, a wall, and the like to the position estimator 72. Then, the position estimator 72 may convert the position information of an obstacle, a wall, and the like into coordinate values on the movement coordinate system, and the position information of an obstacle, a wall, and the like may be stored in the storage 73.

The switch 77 switches and sets the travel mode of the autonomous travel vehicle 100 to either the reproduction travel mode or the manual operation teaching mode based on a set state of the travel mode (the reproduction travel mode or the manual operation teaching mode) of the input interface 53 of the operation interface 5. Further, each unit or functional portion of the controller 7 can refer to the travel mode set by the switch 77 as necessary.

Figure 5:
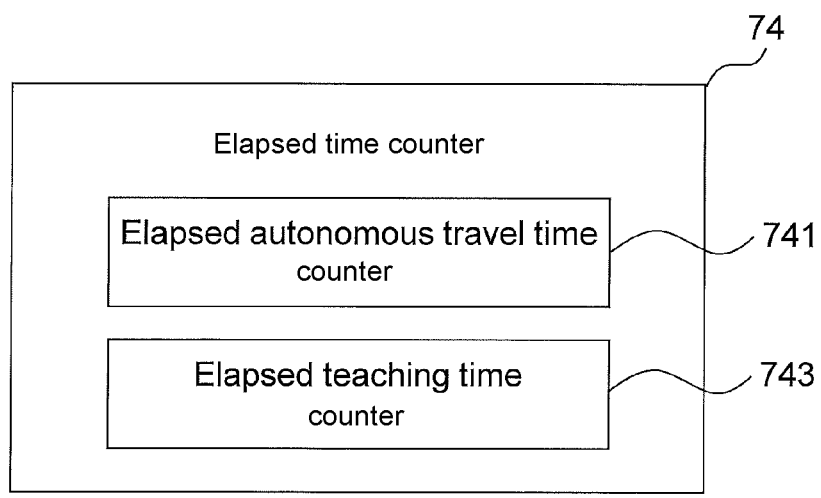
FIG. 5 is a diagram illustrating a structure of an elapsed time counter.

Next, a structure of the elapsed time counter 74 is described with reference to FIG. 5. FIG. 5 is a diagram illustrating a structure of the elapsed time counter. The elapsed time counter 74 includes an elapsed autonomous travel time counter 741, and an elapsed teaching time counter 743.

The elapsed autonomous travel time counter 741 counts the elapsed autonomous travel time when the reproduction travel mode is executed. The elapsed autonomous travel time is an elapsed time from start of the reproduction travel mode.

In this preferred embodiment, the elapsed autonomous travel time counter 741 accumulates a unit elapsed time at each control timing, which is described later, so as to count the elapsed autonomous travel time. The unit elapsed time determines the progress speed of the elapsed autonomous travel time. Note that the unit elapsed time may be a constant value, or a length thereof may be adjustable in accordance with a predetermined condition.

As an example, a control period of the motors 23a and 23b in the motor driver 75 can be used for the unit elapsed time. Alternatively, it is possible to use a clock period of the computer system constituting the controller 7 or a time point used in the computer system as the unit time. If a length of the unit elapsed time is adjustable, for example, the unit elapsed time may be defined as the product of an arbitrary variable and the control period, the clock period, or the time described above. The value of the arbitrary variable may be adjusted in this case.

The elapsed teaching time counter 743 counts the elapsed teaching time when the manual operation teaching mode is executed. The elapsed teaching time counter 743 accumulates a predetermined unit time from start of the manual operation teaching mode, for example, so as to count the elapsed teaching time. As for the predetermined unit time, a control period of the motors 23a and 23b in the motor driver 75, for example, is able to be used. Alternatively, it is possible to use a clock period of the computer system constituting the controller 7 or a time used in the computer system as the unit time.

Figure 6:
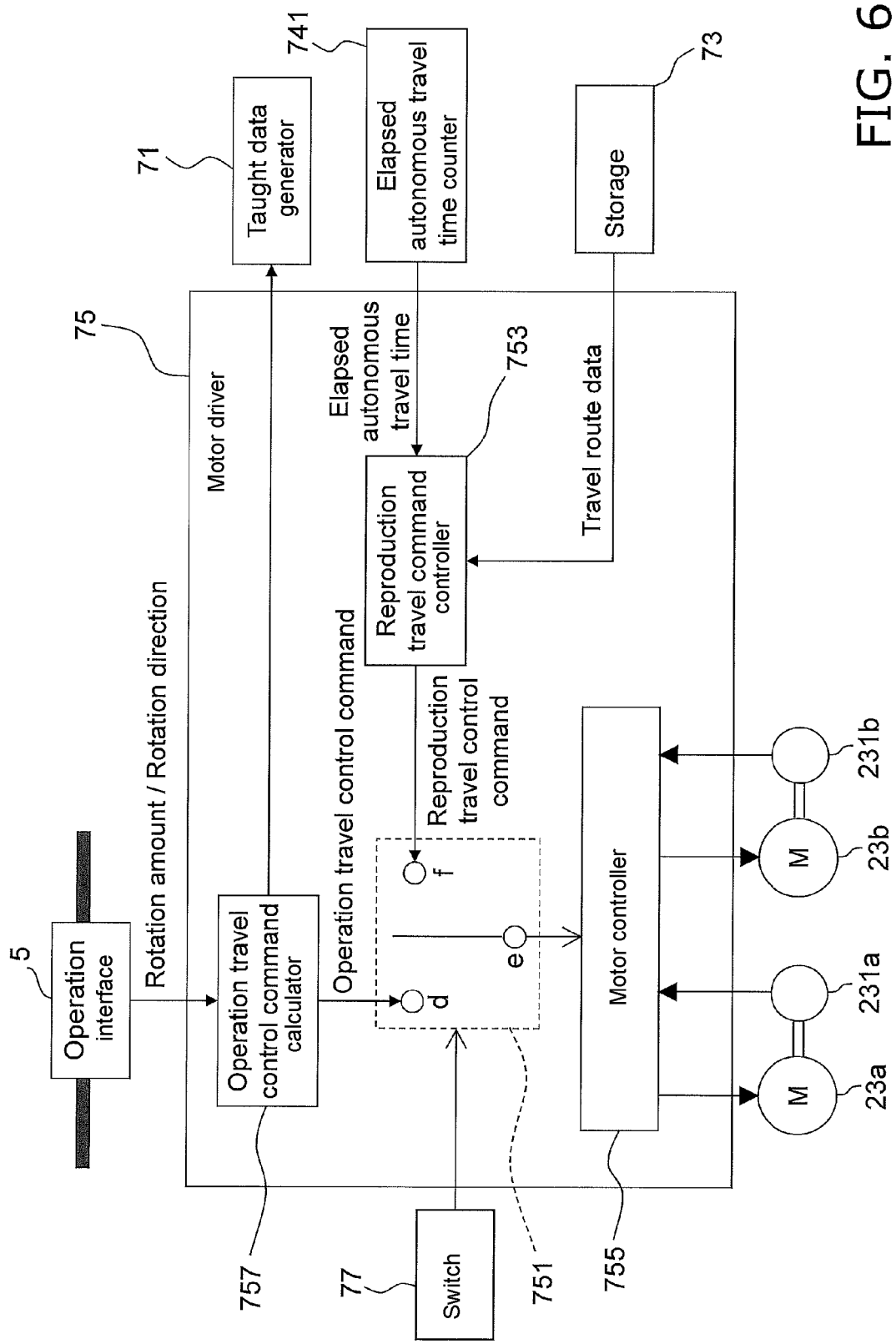
FIG. 6 is a diagram illustrating a structure of a motor driver.

Next, a structure of the motor driver 75 is described with reference to FIG. 6. FIG. 6 is a diagram illustrating a structure of the motor driver.

The motor driver 75 includes a drive switch 751, a reproduction travel command generator 753, a motor controller 755, and an operation drive control command calculator 757.

The drive switch 751 includes three terminals d, e and f. The drive switch 751 refers to a state of the switch 77, and connects the terminal d with the terminal e if the manual operation teaching mode is selected in the switch 77. On the other hand, the drive switch 751 connects the terminal e with the terminal f if the reproduction travel mode is selected.

As a result, the drive switch 751 is able to output the operation travel control command to the motor controller 755 when the manual operation teaching mode is executed. It can also output the reproduction travel control command (described later) calculated by the reproduction travel command generator 753 (described later) to the motor controller 755 when the reproduction travel mode is executed.

The reproduction travel command generator 753 is able to refer to the travel route data 500 stored in the storage 73. In addition, the reproduction travel command generator 753 is able to refer to the elapsed autonomous travel time from the elapsed autonomous travel time counter 741. Further, the reproduction travel command generator 753 is connected to the terminal f of the drive switch 751.

In this way, when the reproduction travel mode is executed, the reproduction travel command generator 753 calculates the reproduction travel control command based on the elapsed autonomous travel time and the data stored and included in the travel route data 500. In this way, the reproduction travel command generator 753 is able to output the reproduction travel control command to the terminal f of the drive switch 751.

In addition, when the reproduction travel command generator 753 calculates the reproduction travel control command, it calculates the corrected traveling speed based on the traveling speed (taught speed) stored and included in the travel route data 500. In other words, the reproduction travel command generator 753 sequentially corrects the traveling speeds stored and included in the travel route data 500 so as to sequentially calculate the new traveling speeds (corrected traveling speeds).

In this way, even if the travel route data 500 has an error due to a measurement error, the error of the travel route data 500 is able to be corrected in accordance with the actual travel. As a result, the platform 1 (the autonomous travel vehicle 100) is able to travel while assuredly reproducing the taught travel route. The details of a structure of the reproduction travel command generator 753 is described later.

The motor controller 755 is able to input, via the drive switch 751 (from the terminal e), the operation travel control command (described later) when the manual operation teaching mode is executed. On the other hand, the motor controller 755 is able to input the reproduction travel control command when the reproduction travel mode is executed, via the drive switch 751 (from the terminal e). In addition, the motors 23a and 23b are electrically connected to the motor controller 755.

Accordingly, the motor controller 755 controls the motors 23a and 23b based on the operation travel control command (namely, using the operation travel control command as the travel control command) when the manual operation teaching mode is executed. On the other hand, it controls the motors 23a and 23b based on the reproduction travel control command (namely, using the reproduction travel control command as the travel control command) when the reproduction travel mode is executed.

In addition, when the motor controller 755 controls the motors 23a and 23b, it monitors the rotation speeds and the rotation amounts of the motors 23a and 23b measured by the encoders 231a and 231b. Further, the motor controller 755 controls the motors 23a and 23b by feeding back the rotation speeds and the rotation amounts of the motors 23a and 23b (as a feedback control).

Accordingly, a motor controller or the like that utilizes a feedback control theory can be used as the motor controller 755.

The operation travel control command calculator 757 is able to input the rotation amounts and/or the rotation directions of the operation handles 51a and 51b of the operation interface 5, so as to calculate the operation travel control command based on the rotation amounts and/or the rotation directions. In addition, the operation travel control command calculator 757 outputs the operation travel control command to the terminal d of the drive switch 751 when the manual operation teaching mode is executed.

Further, the operation travel control command calculator 757 outputs the operation travel control command to the taught data generator 71 when the manual operation teaching mode is executed.

In this preferred embodiment, the operation travel control command is obtained by digitizing the rotation amounts and/or the rotation directions of the operation handles 51a and 51b. For instance, the operation travel control command is able to be a value corresponding to a ratio to the maximum rotation amount of the operation handle 51a or 51b with a positive or negative sign determined by the rotation direction of the operation handle 51a or 51b.

In this case, the motor controller 755 is able to determine the rotation speed of the motor 23a or 23b by multiplying the value indicated in the operation travel control command by the maximum rotation speed of the motor 23a or 23b determined in advance in the motor controller 755.

Figure 7:
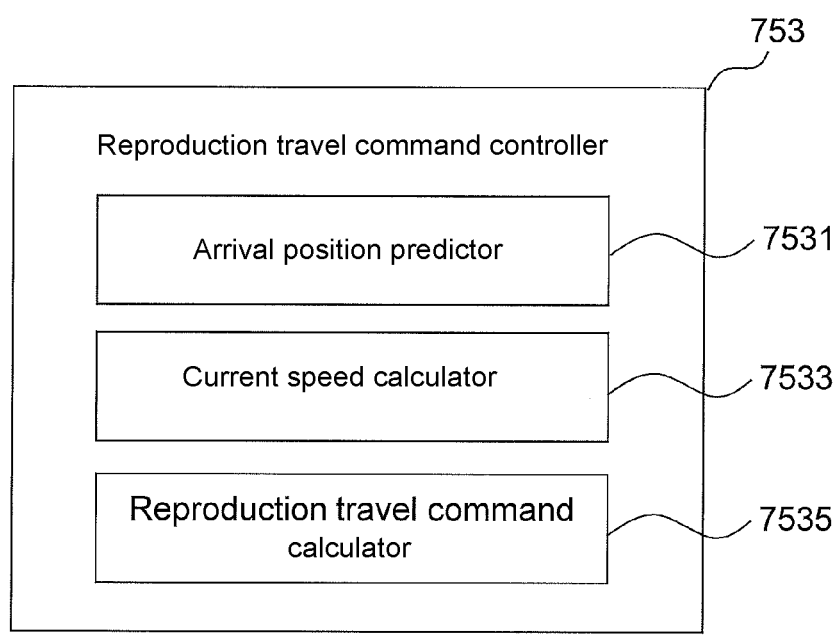
FIG. 7 is a diagram illustrating a structure of a reproduction travel command generator.

Next, a structure of the reproduction travel command generator 753 is described with reference to FIG. 7. FIG. 7 is a diagram illustrating a structure of the reproduction travel command generator.

The reproduction travel command generator 753 includes an arrival position predictor 7531, a corrected speed calculator 7533, and a reproduction travel command calculator 7535.

The arrival position predictor 7531 predicts a position to which the platform 1 is predicted to move in a predetermined time when the reproduction travel mode is executed. In this preferred embodiment, the arrival position predictor 7531 predicts the predicted arrival position, the predicted direction angle, and a straight arrival prediction point.

The predicted arrival position is a position predicted based on the traveling speed and the arrival time stored and included in the travel route data 500. In other words, the predicted arrival position indicates a position that the platform (the autonomous travel vehicle 100) is predicted to reach when using the traveling speed and the arrival time stored and included in the travel route data 500 that may contain a measurement error.

The predicted direction angle is an angle indicating a direction at the predicted arrival position, which is predicted based on the traveling speed and the arrival time stored and included in the travel route data 500. In other words, the predicted direction angle indicates an angle that predicts which direction the platform 1 faces at the predicted arrival position when the travel route data 500 may have a measurement error and as well as the platform 1 turns using the traveling speed and the arrival time stored and included in the travel route data 500 (namely, posture).

The straight arrival prediction point is a point (position) that the platform 1 (the autonomous travel vehicle 100) is predicted to reach when it travels straight from the current position. The straight arrival prediction point is used to evaluate whether or not the platform 1 (the autonomous travel vehicle 100) will cross the travel route when it deviates from the travel route and travels straight without changing its direction. In this preferred embodiment, the straight arrival prediction point is determined to be a position that is a predetermined distance away from the center C (described later) of the platform 1 (the autonomous travel vehicle 100) in the travel direction.

When the reproduction travel mode is executed, the corrected speed calculator 7533 sequentially corrects the traveling speeds stored and included in the travel route data 500 so as to calculate the corrected traveling speed. In this preferred embodiment, the corrected speed calculator 7533 performed two types of traveling speed corrections: (i) the traveling speed correction based on the predicted traveling distance and a required traveling distance; and (ii) the traveling speed correction to join the travel route.

In the traveling speed correction based on the predicted traveling distance and the required traveling distance, the corrected speed calculator 7533 performs the traveling speed correction based on the predicted traveling distance, which is a distance between the current position of the platform 1 (the autonomous travel vehicle 100) and the predicted arrival position predicted by the arrival position predictor 7531, and a distance (required traveling distance), which is required to reach an arrival target subgoal point that corresponds to the target point to be reached by the platform 1 (the autonomous travel vehicle 100).

On the other hand, in the traveling speed correction to join the travel route, the corrected speed calculator 7533 performs the traveling speed correction by calculating a corrected parallel speed component (described later) that includes a travel route correction speed component (described later), based on a travel route error between the planned travel route and the platform 1 (the autonomous travel vehicle 100), and a parallel speed component $V_C$, which is described later. Here, the travel route correction speed component is a speed component that causes the platform 1 to turn towards the direction to approach the travel route.

Note that, in this preferred embodiment, the corrected speed calculator 7533 first performs the traveling speed correction based on the predicted traveling distance and the required traveling distance, and then performs the traveling speed correction to join the travel route on the corrected traveling speed. In this way, even if the platform 1 (the autonomous travel vehicle 100) is at a position deviating from the travel route, the autonomous travel vehicle 100 is able to join the travel route and reach the target point to be reached (the arrival target subgoal point).

A method of the traveling speed correction in the corrected speed calculator 7533 will be described later in detail.

The reproduction travel command calculator 7535 calculates the reproduction travel control command as the travel control command, when the reproduction travel mode is executed. In this preferred embodiment, the reproduction travel command calculator 7535 calculates the reproduction travel control command (the travel control command) based on the traveling speed corrected by the corrected speed calculator 7533 (the corrected traveling speed).

In this way, even if the travel route data 500 has an error generated by a measurement error, the corrected speed calculator 7533 is able to correct the error of the travel route data 500 in accordance with the actual travel. As a result, even if the travel route data 500 has the error, the reproduction travel command calculator 7535 is able to calculate the reproduction travel control command (travel control command) that enables the autonomous travel vehicle 100 to travel while assuredly reproducing the original taught travel route.

Figure 8:
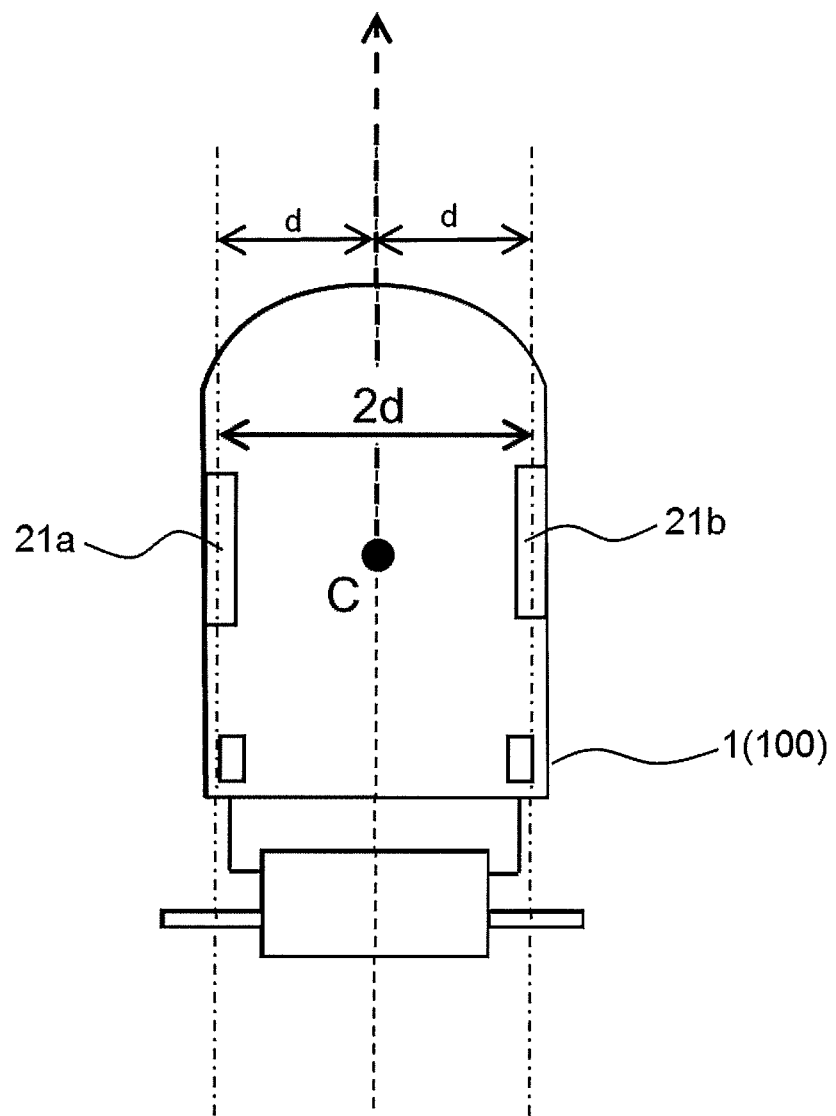
FIG. 8 is a diagram illustrating definitions of a center and a vehicle width of the platform (the autonomous travel vehicle).

Next, an operation of the autonomous travel vehicle 100 according to this preferred embodiment is described. First, a travel principle of the autonomous travel vehicle 100 (the platform 1) including the opposed two-wheel differential type traveler 2 is described. Here, as illustrated in FIG. 8, in the platform 1 (the autonomous travel vehicle 100), a center C of the platform 1 (the autonomous travel vehicle 100) and a distance between the main wheel 21a and the main wheel 21b (a vehicle width 2d) are defined. In this case, a distance between the center C and the main wheel 21a or 21b is defined as d. FIG. 8 is a diagram illustrating the definitions of the center of the platform (the autonomous travel vehicle) and the vehicle width.

Figure 9:
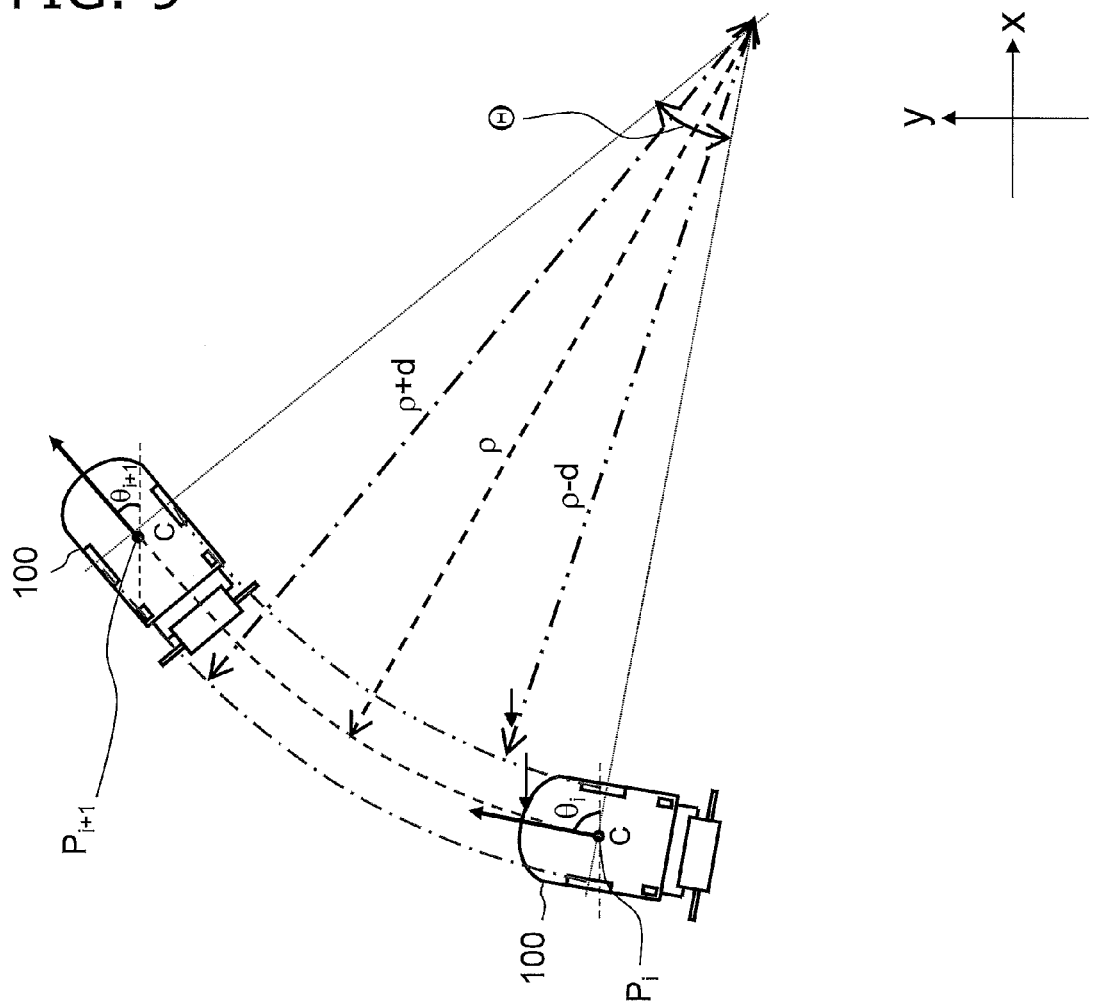
FIG. 9 is a diagram illustrating a turning travel of the platform (the autonomous travel vehicle).

Here, the travel principle is described with an example of a case illustrated in FIG. 9, in which the platform 1 (the autonomous travel vehicle 100) turns by an angle Θ (in radian, hereinafter angles used in this preferred embodiment are radian angles) with a curvature radius (radius) ρ from a subgoal point $P_i$ to a subgoal point $P_{i+1}$. FIG. 9 is a diagram illustrating a turning of the platform (the autonomous travel vehicle).

In the turning illustrated in FIG. 9, the center C of the platform 1 (the autonomous travel vehicle 100) turns with the curvature radius ρ. In this case, an outer main wheel in the turning (the main wheel 21a in the case of turning illustrated in FIG. 9) turns with a curvature radius ρ+d, and an inner main wheel in the turning (the main wheel 21b) turns with a curvature radius ρ−d.

As a result, when the platform 1 (the autonomous travel vehicle 100) moves from the subgoal point $P_i$ to the subgoal point $P_{i+1}$, the center C moves by a distance ρΘ, the outer main wheel 21a moves by a distance (ρ+d)Θ, and the inner main wheel 21b moves by a distance (ρ−d)Θ. As understood from the expressions described above, the movement distance (ρ+d)Θ of the outer main wheel 21a is different from the movement distance (ρ−d)Θ of the inner main wheel 21b. In this way, by differentiating between movement distances (traveling speeds) of the pair of main wheels 21a and 21b, the platform 1 (the autonomous travel vehicle 100) equipped with the opposed two-wheel differential type traveler 2 is able to turn.

Supposing that the platform 1 (the autonomous travel vehicle 100) travels from the subgoal point $P_i$ to the subgoal point $P_{i+1}$ per a unit time, the movement distance ρΘ of the center C is able to be defined as a center speed $V_C$, the movement distance (ρ+d)Θ of the main wheel 21a is able to be defined as a first traveling speed $V_1$, and the movement distance (ρ−d)Θ of the main wheel 21b is able to be defined as a second traveling speed $V_2$.

In addition, as understood from the expressions described above, the first traveling speed $V_1$ and the second traveling speed $V_2$ have a common speed component ρΘ and a speed component dΘ. Further, the first traveling speed $V_1$ and the second traveling speed $V_2$ are obtained by adding or subtracting the speed component de to or from the speed component ρΘ. Further, whether to add or subtract dΘ to or from ρΘ to obtain the first traveling speed $V_1$ or the second traveling speed $V_2$ depends on a turning direction (turning left or right) of the platform 1 (the autonomous travel vehicle 100).

The speed component ρΘ of the two speed components is the same as the speed $V_C$ of the center C. In other words, the speed component ρΘ is a speed that determines the speed of the center C (the center speed), and hence it is referred to as the "parallel speed component $V_C$".

On the other hand, the speed component dΘ is a speed causing a traveling speed difference between the first traveling speed $V_1$ and the second traveling speed $V_2$ so that the platform 1 is able to turn, and hence it is referred to as a "turning speed component $V_R$".

In addition, the turning speed component $V_R$ expressed as DΘ is able to be expressed using $(d/\rho)V_C$, the parallel speed component $V_C$, and a turning radius (curvature radius) ρ. In other words, if the travel route data 500 includes a traveling speed corresponding to the parallel speed component $V_C$, the turning speed component $V_R$ is able to be calculated from the traveling speed and the turning radius (curvature radius) ρ stored and included in the travel route data 500.

Accordingly, in this preferred embodiment, the travel route data 500 includes the travel curvature radii ($\rho_1$, $\rho_2$, . . . ) (described later) when the platform 1 (the autonomous travel vehicle 100) passes the subgoal points, in association with the subgoal points.

Further, if the travel curvature radius ρ is not stored and included in the travel route data 500, for example, the travel curvature radius (turning radius) ρ at each subgoal point may be calculated from the subgoal points stored and included in the travel route data 500 using the method described later.

Figure 10A:
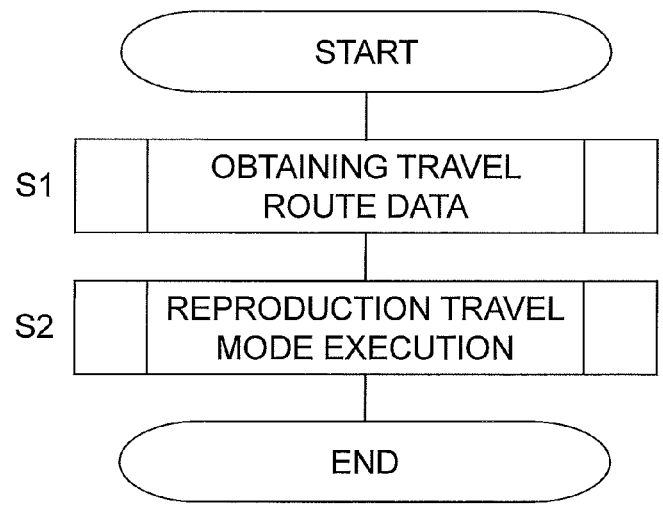
FIG. 10A is a flowchart illustrating an operation of the autonomous travel vehicle.

Next, an operation of the autonomous travel vehicle 100 of this preferred embodiment is described with reference to FIG. 10A. FIG. 10A is a flowchart illustrating an operation of the autonomous travel vehicle. In this preferred embodiment, there is described an example in which the operator operates the operation interface 5 so that the autonomous travel vehicle 100 travels and that the travel route is taught to the autonomous travel vehicle 100, and then taught travel route is reproduced when the reproduction travel mode is executed.

In the autonomous travel vehicle 100, the taught data generator 71 first obtains the travel route data 500 of the travel route that the autonomous travel vehicle 100 passes when the operator operates the autonomous travel vehicle 100, and stores the travel route data 500 in the storage 73 (Step S1).

A method of acquiring the travel route data 500 in Step S1 will be described later in detail.

After the travel route data 500 is obtained, in order that the autonomous travel vehicle 100 executes the autonomous travel, the travel mode of the autonomous travel vehicle 100 is switched to the reproduction travel mode by the input interface 53 or the like. Further, the autonomous travel vehicle 100 autonomously travels while reproducing the travel route based on the travel route data 500 (Step S2).

When the autonomous travel vehicle 100 autonomously travels while reproducing the travel route based on the travel route data 500, the corrected speed calculator 7533 sequentially corrects the traveling speeds stored and included in the travel route data 500 (namely, calculates the corrected traveling speeds). Further, the reproduction travel command calculator 7535 calculates the reproduction travel control command based on the corrected traveling speed (the corrected traveling speed).

In this way, the traveling speeds stored and included in the travel route data 500 are sequentially corrected, and the travel control command (the reproduction travel control command) is calculated based on the corrected traveling speeds (the corrected traveling speeds). Thus, even if the data stored and included in the travel route data 500 has an error, it is possible to travel while assuredly reproducing the travel route.

Figure 10B:
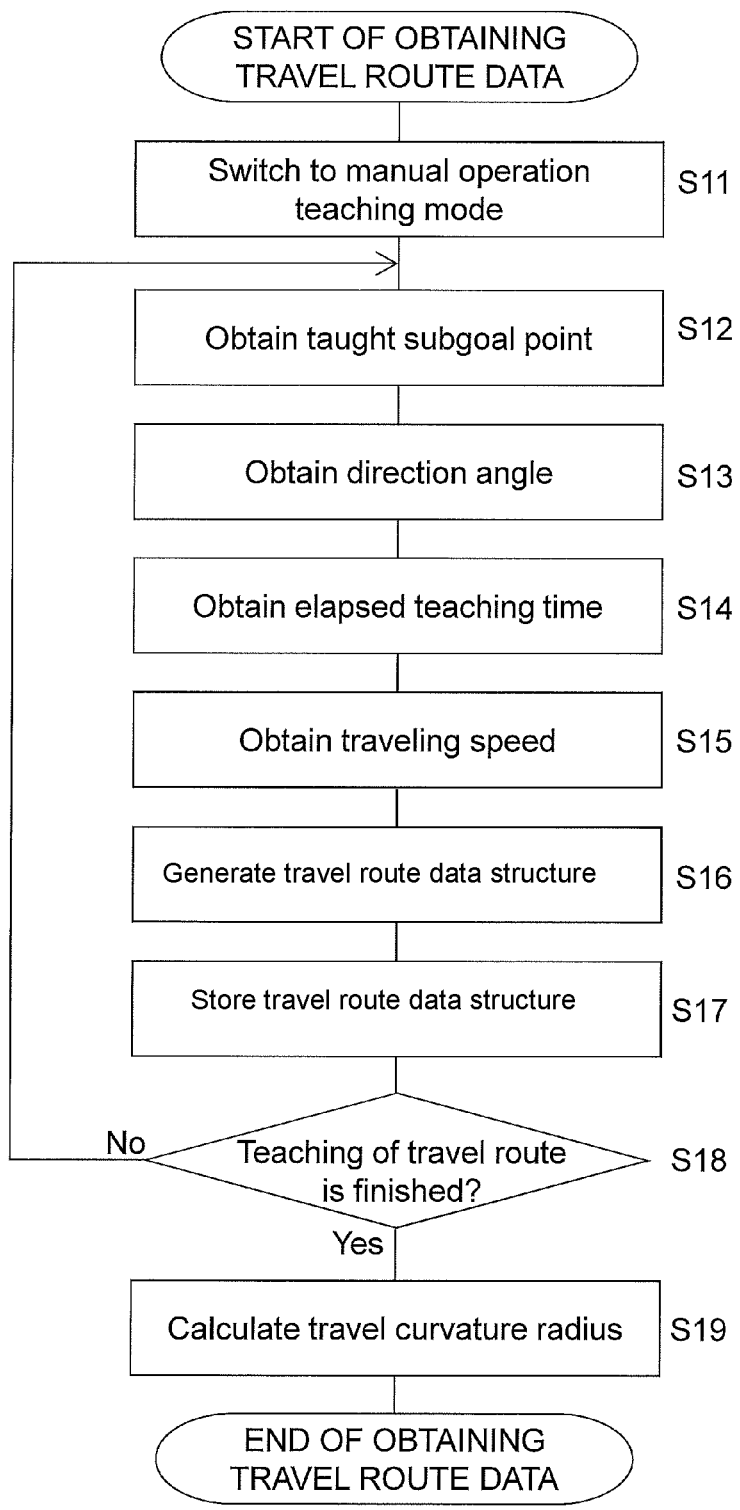
FIG. 10B is a flowchart illustrating a method of acquiring travel route data.

Next, a method of obtaining the travel route data 500 in Step S1 of FIG. 10A is described with reference to FIG. 10B. FIG. 10B is a flowchart illustrating a method of obtaining the travel route data.

When starting obtaining the travel route data 500, the travel mode of the autonomous travel vehicle 100 is set to the manual operation teaching mode (Step S11). Switching of the travel mode to the manual operation teaching mode is made, for example, by the operator operating the input interface 53 of the operation interface 5.

When the travel mode is switched to the manual operation teaching mode by the input interface 53, the switch 77 of the controller 7 is informed that the travel mode has changed to the manual operation teaching mode. Then, the switch 77 instructs the drive switch 751 of the motor driver 75 to connect the terminal d with the terminal e in the drive switch 751. In this way, the operation travel control command, which is calculated based on the rotation amounts and the rotation directions of the operation handles 51a and 51b of the operation interface 5, is input to the motor controller 755.

In this way, the operator is able to manually operate the autonomous travel vehicle 100 by adjusting the rotation amounts and the rotation directions of the operation handles 51a and 51b.

In addition, at the timing when the travel mode is set to the manual operation teaching mode, the elapsed teaching time counter 743 starts counting the elapsed teaching time. In this preferred embodiment, the elapsed teaching time counter 743 accumulates the control period of the motors 23a and 23b as the unit time from start of the manual operation teaching mode so as to count the elapsed teaching time. In addition, counting of the elapsed teaching time may be started by an arbitrary starting instruction by the operator.

After the travel mode is set to the manual operation teaching mode, the operator uses the operation interface 5 to manually operate the autonomous travel vehicle 100. During the manual operation by the operator, the taught data generator 71 obtains positions on the movement plane that the autonomous travel vehicle 100 passes via the operation of the operator as the taught subgoal points every predetermined time (Step S12).

When obtaining the subgoal point, the taught data generator 71 instructs the position estimator 72 to estimate a current position (coordinates of the subgoal point) of the autonomous travel vehicle 100 on the movement coordinate system. Further, the position estimator 72 responds to the instruction and outputs the position (subgoal point) expressed by coordinate values as the taught subgoal point to the taught data generator 71.

In addition, in this preferred embodiment, when the taught data generator 71 obtains the taught subgoal point, it obtains information about a current direction (direction angle θ) of the autonomous travel vehicle 100 (the platform 1) at the taught subgoal point (Step S13). The current direction angle θ is able to be estimated by map matching between the environment map and the local map performed by the position estimator 72.

After obtaining the taught subgoal point and the direction angle at the taught subgoal point, the taught data generator 71 obtains the elapsed teaching time when the taught subgoal point is obtained, from the elapsed teaching time counter 743 (Step S14).

Further, the taught data generator 71 obtains the speed of the autonomous travel vehicle 100 (traveling speed) when passing the obtained subgoal point, as the taught speed (Step S15).

In this case, the taught data generator 71 receives from the operation travel control command calculator 757 the operation travel control command calculated from the rotation amounts and the rotation directions of the operation interface 5 by the operation by an operator. Then, the taught data generator 71 obtains the received operation travel control command as the taught speed.

Alternatively, the taught data generator 71 may calculate the taught speed from the rotation amounts per unit time of the motors 23a and 23b or the main wheels 21a and 21b. Further, the taught data generator 71 may calculate the taught speed from a change of the position of the autonomous travel vehicle 100 per unit time, which is estimated by the position estimator 72. Thus, through an appropriate method, the taught data generator 71 is able to obtain the taught speed.

In this preferred embodiment, the parallel speed component $V_C$ corresponding to the center speed $V_C$ of the platform (the autonomous travel vehicle 100) equipped with the opposed two-wheel differential type traveler 2 is stored and included in the travel route data 500. Accordingly, the taught data generator 71 calculates a taught parallel speed component from the taught speed (corresponding to the rotation speed of the main wheels 21a and 21b) by the method described above in the description of the travel principle of the traveler 2.

Note that, the travel route data 500 is not limited to store the taught parallel speed component, but may store the first traveling speed $V_1$ (described later) and the second traveling speed $V_2$ (described later) as taught speeds. The first traveling speed $V_1$ refers to the rotation speed of the main wheel 21a. The second traveling speed $V_2$ refers to the rotation speed of the main wheel 21b.

By executing Steps S12 to S15, the taught subgoal point, the elapsed teaching time when the taught subgoal point is obtained, the taught parallel speed component when the taught subgoal point is obtained, and the direction angle at the taught subgoal point are obtained. Afterwards, the taught data generator 71 associates the taught subgoal point, the elapsed teaching time, the taught parallel speed component, and the direction angle with each other, so as to generate a travel route data structure 500-$k$ as illustrated in FIG. 11A (Step S16). FIG. 11A is a diagram illustrating an example of the travel route data structure. In addition, execution order of Steps S12 to S15 may be appropriately changed.

The travel route data structure 500-$k$ illustrated in FIG. 11A is a travel route data structure generated with respect to the k-th obtained taught subgoal point. As illustrated in FIG. 11A, the travel route data structure 500-$k$ includes an arrival time storage area 501-$k$, a subgoal point storage area 503-$k$, a direction angle storage area 505-$k$, and a taught speed storage area 507-$k$. In this travel route data structure 500-$k$, the arrival time storage area 501-$k$, the subgoal point storage area 503-$k$, the direction angle storage area 505-$k$, and the taught speed storage area 507-$k$ are linked in the lateral direction of the paper plane.

The arrival time storage area 501-$k$ of the travel route data structure 500-$k$ stores the elapsed teaching time when the k-th taught subgoal point is obtained, as an arrival time ($T_k$). The subgoal point storage area 503-$k$ stores coordinate values ($x_k$, $y_k$) of the k-th obtained taught subgoal point. The direction angle storage area 505-$k$ stores a direction angle ($\theta_k$) of the k-th obtained taught subgoal point. Further, the taught speed storage area 507-$k$ stores a taught speed (the taught parallel speed component) ($v_k$) at the k-th taught subgoal point ($x_k$, $y_k$).

After generating the travel route data structure 500-$k$, the taught data generator 71 stores the travel route data structure 500-$k$ in the storage 73 (Step S17).

When the travel route data structure 500-$k$ is stored in the storage 73, if some travel route data structures are already stored in the storage 73 so that the travel route data 500 (FIG. 11B) is formed, the travel route data structure 500-$k$ generated this time is added to the end of the stored travel route data 500.

After storing the travel route data structure 500-$k$ in the storage 73, the taught data generator 71 checks whether or not the teaching of the travel route by the operator's manual operation is finished before the next taught subgoal point is obtained (Step S18). Here, as to the determination whether or not the teaching of the travel route is finished, it is possible, for example, to provide the operation interface 5 with a switch (not shown) that informs the taught data generator 71 that the teaching of the travel route is finished. This allows the operator to be able to operate the switch to inform that the teaching of the travel route is finished.

Alternatively, the taught data generator 71 may determine that the teaching of the travel route is finished when it is detected for a preset constant time that the rotation amounts of the operation handles 51a and 51b are zero (indicating no operation). Alternatively, it is possible to determine whether or not the teaching of the travel route is finished by other methods that detect that the operator has finished the operation of the autonomous travel vehicle 100.

When it is determined that the teaching of the travel route by the operator's manual operation is finished ("Yes" in Step S18), the taught data generator 71 proceeds to Step S19.

On the other hand, if it is determined that the teaching of the travel route by the operator's manual operation continues ("No" in Step S18), the process returns to Step S12, so as to continue the generation and storing of the travel route data structure 500-k. In this way, the taught data generator 71 is able to continue generating and storing the travel route data structure 500-k as long as the teaching of the travel route continues (namely, as long as the manual operation teaching mode is executed).

For instance, if the generation and storing of the travel route data structure 500-k continue until n taught subgoal points are obtained, the travel route data 500 as illustrated in FIG. 11B is obtained. FIG. 11B is a diagram illustrating an example of the travel route data.

In the travel route data 500 illustrated in FIG. 11B, n+1 travel route data structures 500-0, 500-1, 500-2, 500-3, ..., 500-n−1, and 500-n are linked to stack from up to down on the paper plane in the execution order.

In this way, by executing Steps S11 to S18 described above, the taught data generator 71 is able to generate the travel route data 500 as illustrated in FIG. 11B, which stores the subgoal points, the arrival times when the subgoal points are obtained, and the traveling speeds at the subgoal points, in association with each other.

After generating the travel route data 500 as illustrated in FIG. 11B, the taught data generator 71 calculates the travel curvature radii ρ when the platform 1 (the autonomous travel vehicle 100) passes the subgoal points, and the calculated travel curvature radii are stored and included in the travel route data 500 by associating with the subgoal points (Step S19).

The travel curvature radius ρ is able to be calculated as a radius of a circle formed of three subgoal points including, for example, a first target subgoal point for which the travel curvature radius ρ is calculated, a second target subgoal point that is apart from the first target subgoal point by a predetermined distance and is stored before the first target subgoal point, and a third target subgoal point that is apart from the first target subgoal point by a predetermined distance and is stored after the first target subgoal point. In this way, the travel curvature radius ρ is able to be calculated by a simple calculation.

In addition, by using another target subgoal point apart from the first target subgoal point by a predetermined distance to calculate the travel curvature radius ρ, even if the subgoal point stored and included in the travel route data 500 has a measurement error (noise component), it is possible to calculate the appropriate travel curvature radius ρ in which influence of the measurement error (noise component) is reduced.

Note that it is preferred to select an appropriate value as the "predetermined distance" when selecting the subgoal point to calculate the travel curvature radius ρ. It is because if the predetermined distance is too small, the influence of the measurement error of the subgoal point cannot be sufficiently reduced.

On the other hand, if the predetermined distance is too large, the travel curvature radius ρ may be unable to sufficiently express the travel route indicated in the travel route data 500.

Further, in the method of calculating the travel curvature radius ρ described above, at the first taught subgoal point for which the second taught subgoal point or the third taught subgoal point cannot be selected (namely, if the first taught subgoal point is close to a start point of the travel route or is close to an end point of the travel route), the travel curvature radius ρ is regarded to be infinite (namely, it is regraded that a partial travel route at the first taught subgoal point is a straight line).

The taught data generator 71 sequentially calculates the travel curvature radii for all the subgoal points stored and included in the travel route data 500 by the calculation method described above, and stores the travel curvature radii ($ρ_0, ρ_1, \ldots ρ_n$) at respective subgoal points in the travel route data structure 500-0, ... 500-n, respectively. As a result, the travel route data 500 as illustrated in FIG. 11C is eventually generated. FIG. 11C is a diagram illustrating the travel route data storing the travel curvature radii.

Figure 11D:
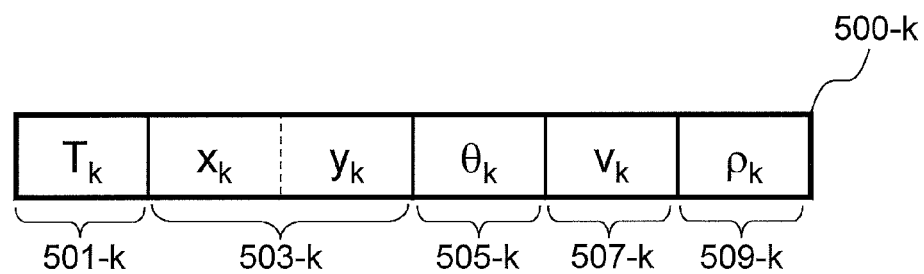
FIG. 11D is a diagram illustrating the travel route data structure including a travel curvature radius storage area.

As a result of generation of the travel route data 500 as illustrated in FIG. 11C, the travel route data structure 500-k (k=0, 1, ... n) further includes a travel curvature radius storage area 509-k that stores the travel curvature radius ($ρ_k$) as illustrated in FIG. 11D. FIG. 11D is a diagram illustrating the travel route data structure including the travel curvature radius storage area.

By executing the Steps S11 to S18 illustrated in FIG. 10B, it is possible to store the taught travel route having a concept of time in the travel route data 500 via the operation of the operator.

In addition, by calculating the travel curvature radius ρ in advance to store in the travel route data 500 in Step S19, it is not necessary to calculate the travel curvature radius ρ when the reproduction travel mode is executed.

Next, the reproduction travel by the autonomous travel vehicle 100 in Step S2 of the flowchart illustrated in FIG. 10A is described.

First, in order to cause the autonomous travel vehicle 100 to reproduce and travel the travel route based on the generated travel route data 500, the travel mode is switched to the reproduction travel mode. The travel mode is able to be switched to the reproduction travel mode by an operation of the input interface 53.

When the travel mode is switched to the reproduction travel mode, the autonomous travel vehicle 100 reproduces and travels the travel route, while reproducing the taught operation based on the travel route data 500 (execution of the reproduction travel mode). When the reproduction travel mode is executed, the corrected speed calculator 7533 of the reproduction travel command generator 753 sequentially corrects the traveling speeds stored and included in the travel route data 500 so as to calculate the corrected traveling speeds by the method described later.

Next, the reproduction travel command calculator 7535 calculates the reproduction travel control command based on the corrected traveling speed. After calculating the reproduction travel control command, the reproduction travel command generator 753 outputs the calculated reproduction travel control command as the travel control command to the motor controller 755 via the drive switch 751.

As a result, even if each data stored and included in the travel route data 500 has an error, the autonomous travel vehicle 100 is able to travel while assuredly reproducing the taught travel route.

Next, the traveling speed correction when the reproduction travel mode is executed is described. In this preferred embodiment, either or both of two traveling speed corrections are performed, which include (i) traveling speed correction based on the predicted traveling distance and the required traveling distance, and (ii) traveling speed correction to join the travel route.

Note that, in the autonomous travel vehicle 100 of this preferred embodiment including the opposed two-wheel differential type traveler 2, the parallel speed component $V_C$ and the turning speed component $V_R$ described above are corrected in the traveling speed correction described below. Then, by using a corrected parallel speed component $V_C'$ and a corrected turning speed component $V_R'$, the corrected traveling speed for the first traveling speed $V_1$ and the corrected traveling speed for the second traveling speed $V_2$ are calculated.

In addition, as illustrated in FIG. 11C, in this preferred embodiment, the travel route data 500 includes the parallel speed component $V_C$ and the travel curvature radius $\rho$. Accordingly, the turning speed component $V_R$ is calculated from the relationship described above by using the parallel speed component $V_C$ and the travel curvature radius $\rho$.

(i) Correction Based on Predicted Traveling Distance and Required Traveling Distance First, the traveling speed correction based on the predicted traveling distance and the required traveling distance is described. In this preferred embodiment, as the correction based on the predicted traveling distance and the required traveling distance, there are a case where a distance between the subgoal points (the current subgoal point $P_p$ and the arrival target subgoal point $P_O$) stored and included in the travel route data 500 is defined as the required traveling distance as illustrated in FIG. 12A, and a case where a distance between a current position P of the platform 1 and the target point to be reached (corresponding to the arrival target subgoal point $P_O$) is defined as the required traveling distance as illustrated in FIG. 12B.

Figure 12A:
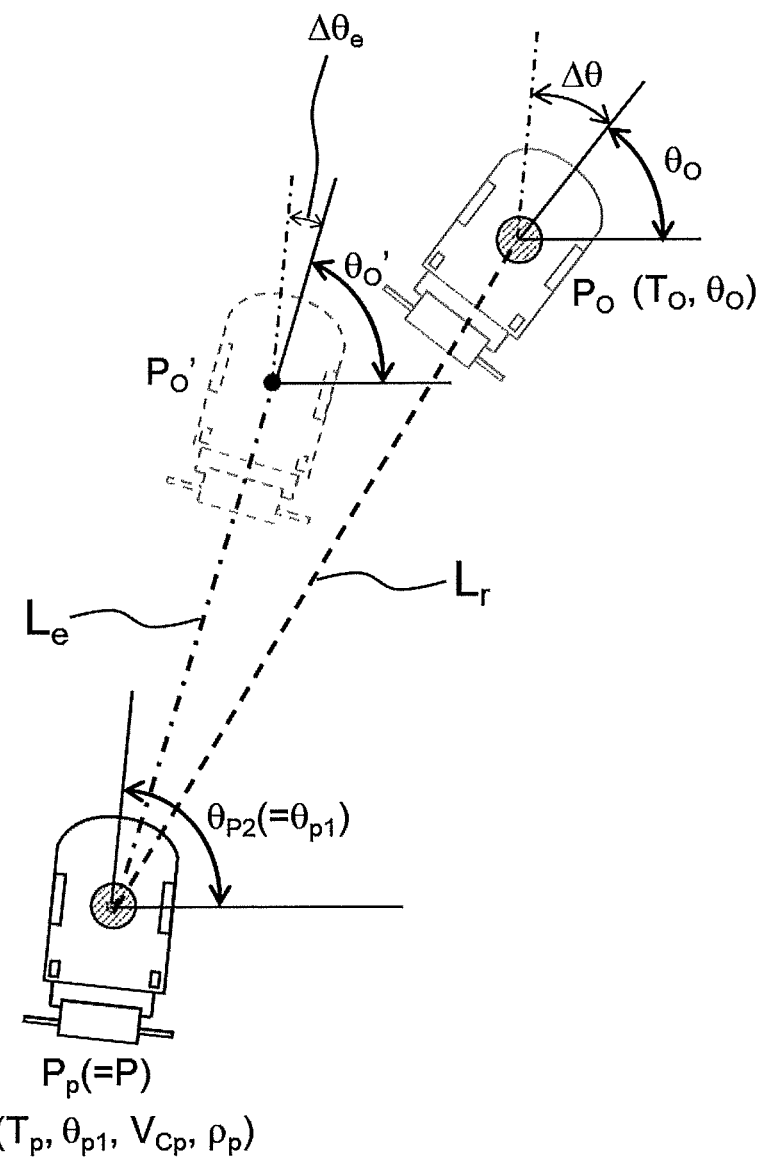
FIG. 12A is a diagram schematically illustrating traveling speed correction when a required traveling distance is defined as a distance between a current subgoal point and an arrival target subgoal point.
Figure 12B:
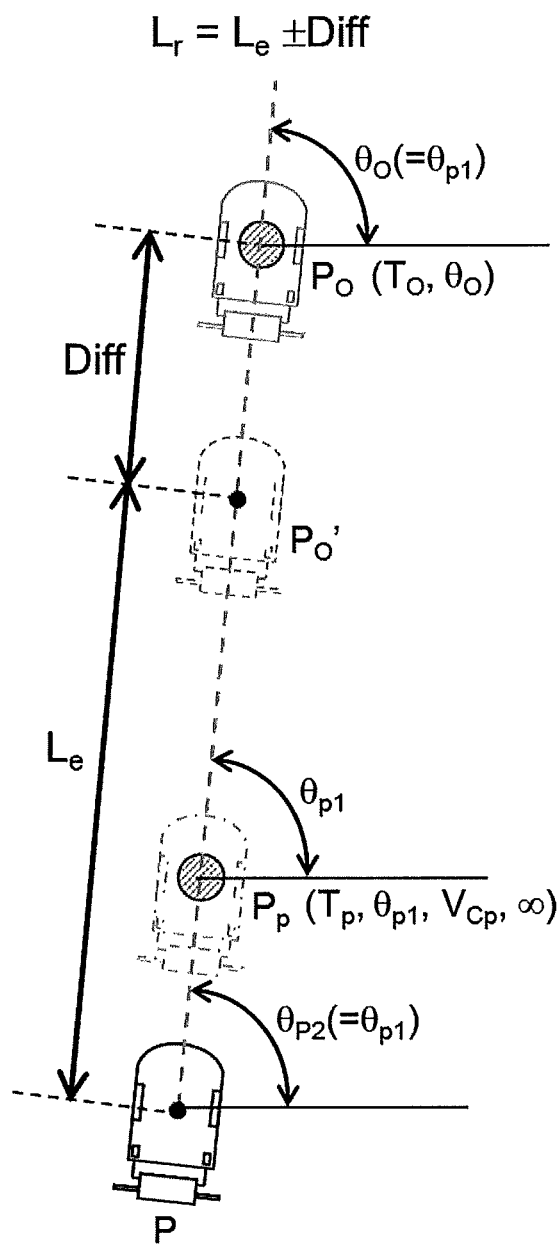
FIG. 12B is a diagram schematically illustrating traveling speed correction when the required traveling distance is defined as a distance between a current position and the arrival target subgoal point.

FIG. 12A is a diagram schematically illustrating the traveling speed correction when the required traveling distance is defined as the distance between the current subgoal point and the arrival target subgoal point. FIG. 12B is a diagram schematically illustrating the traveling speed correction when the required traveling distance is defined as the distance between the current position and the arrival target subgoal point. Each of the traveling speed corrections is described below.

(a) Case where the Distance between Subgoal Points is Required Traveling Distance First, the traveling speed correction when the distance between the subgoal points stored and included in the travel route data 500 is defined as the required traveling distance is described with reference to FIG. 12A. The example illustrated in FIG. 12A is the case where the current position P of the platform 1 (the autonomous travel vehicle 100) is a position corresponding to one of the subgoal points stored and included in the travel route data 500 (the current subgoal point $P_p$ (described later)).

The corrected speed calculator 7533 first determines the current subgoal point that is a subgoal point corresponding to the current position P of the platform 1. The corrected speed calculator 7533 sets the current subgoal point $P_p$ to the subgoal point associated with the arrival time when the current elapsed autonomous travel time becomes the time point corresponding to the arrival time stored and included in the travel route data 500.

In this way, even if the autonomous travel vehicle 100 detects an obstacle or the like so that the platform 1 (the autonomous travel vehicle 100) stops or decelerates, for example, an appropriate current subgoal point is able to be selected.

Next, the arrival position predictor 7531 reads the current traveling speed (a current parallel speed component $V_{Cp}$) associated with the current subgoal point $P_p$ from the travel route data 500. Then, the arrival position predictor 7531 calculates a current turning speed component $V_{Rp}$ using the read current parallel speed component $V_{Cp}$ and a current travel curvature radius $\rho_p$ associated with the current subgoal point.

After that, the arrival position predictor 7531 calculates the first traveling speed $V_1$ and the second traveling speed $V_2$ using the current parallel speed component $V_{Cp}$ and the current turning speed component $V_{Rp}$. In addition, the arrival position predictor 7531 reads from the travel route data 500 a next arrival time $T_O$ which is the time at which the platform 1 reaches the target point.

In this preferred embodiment, a position corresponding to the subgoal point stored in a travel route data structure 500-(p+1) next to a travel route data structure 500-p storing the current subgoal point $P_p$ is the target point of the platform 1. In other words, the subgoal point stored in the next travel route data structure 500-(p+1) is the arrival target subgoal point $P_O$. Accordingly, the next arrival time $T_O$ is the arrival time stored in the travel route data structure 500-(p+1).

Next, the arrival position predictor 7531 uses the calculated first traveling speed $V_1$ and second traveling speed $V_2$ to predict a predicted arrival position $P_O'$ that is predicted to be reached by the platform 1 in a time between a current arrival time $T_p$ (corresponding to the elapsed autonomous travel time) associated with the current subgoal point $P_p$ and the next arrival time $T_O$, and a predicted direction angle $\theta_O'$ indicating a direction of the platform 1 at the predicted arrival position $P_O'$.

After the arrival position predictor 7531 predicts the predicted arrival position $P_O'$ and the predicted direction angle $\theta_O'$, the corrected speed calculator 7533 calculates a required traveling distance $L_r$ as a distance between the current subgoal point $P_p$ and the arrival target subgoal point $P_O$. In addition, the corrected speed calculator 7533 calculates a predicted traveling distance $L_e$ as a distance between the current position P of the platform 1 and the predicted arrival position $P_O'$.

On the other hand, the corrected speed calculator 7533 calculates a target direction angle change $\Delta\theta$ as a difference between an arrival target direction angle $\theta_O$ associated with the arrival target subgoal point $P_O$ and a first current direction angle $\theta_{p1}$ associated with the current subgoal point $P_p$. In addition, the corrected speed calculator 7533 calculates a difference between the predicted direction angle $\theta_O'$ and a second current direction angle $\theta_{p2}$ indicating the current direction of the platform 1 as a predicted direction angle change $\Delta\theta_e$.

After the required traveling distance $L_r$ and the predicted traveling distance $L_e$ are calculated, if the predicted traveling distance $L_e$ is smaller than the required traveling distance $L_r$, the corrected speed calculator 7533 calculates the corrected parallel speed component $V_C'$ that is corrected such that the current parallel speed component $V_{Cp}$ is increased. On the other hand, if the predicted traveling distance $L_e$ is larger than the required traveling distance $L_r$, the corrected speed calculator 7533 calculates the corrected parallel speed component $V_C'$ that is corrected such that the current parallel speed component $V_{Cp}$ is decreased.

In this preferred embodiment, the corrected speed calculator 7533 calculates the product of the current parallel speed component $V_{Cp}$ and a ratio (first ratio) between the required traveling distance $L_r$ and the predicted traveling distance $L_e$ as the corrected parallel speed component $V_C'$ that is a corrected speed of the parallel speed component.

In addition, after the target direction angle change $\Delta\theta$ and the predicted direction angle change $\Delta\theta_e$ are calculated, if the predicted direction angle change $\Delta\theta_e$ is smaller than the target direction angle change $\Delta\theta$, the corrected speed calculator 7533 calculates the corrected turning speed component $V_R'$ that is corrected such that the current turning speed component $V_{Rp}$ is increased. On the other hand, if the predicted direction angle change $\Delta\theta_e$ is larger than the target direction angle change $\Delta\theta$, the corrected speed calculator 7533 calculates the corrected turning speed component $V_R'$ that is corrected such that the current turning speed component $V_{Rp}$ is decreased.

In this preferred embodiment, the corrected speed calculator 7533 calculates the product of the current turning speed component $V_{Rp}$ and a ratio (second ratio) between the target direction angle change $\Delta\theta$ and the predicted direction angle change $\Delta\theta_e$ as the corrected turning speed component $V_R'$.

As described above, because the corrected parallel speed component $V_C'$ is calculated based on the predicted traveling distance $L_e$ and the required traveling distance $L_r$, even if the travel route data 500 has an error generated by a measurement error, the error of the travel route data 500 is able to be corrected in accordance with the actual travel.

In addition, because the required traveling distance $L_r$ is the distance between the current subgoal point $P_p$ stored and included in the travel route data 500 and the arrival target subgoal point $P_O$, even if the subgoal point, the arrival time, and the traveling speed included in the travel route data 500 do not appropriately corresponded to each other, the autonomous travel vehicle 100 is able to travel while assuredly reproducing the taught travel route.

In addition, because the corrected turning speed component $V_R'$ is calculated based on the target direction angle change $\Delta\theta$ and the predicted direction angle change $\Delta\theta_e$, even if the travel route data 500 has an error generated by a measurement error, the error of the travel route data 500 is able to be corrected in accordance with the actual travel. As a result, when the autonomous travel vehicle 100 travels along the travel route while changing its direction, autonomous travel vehicle 100 is able to travel while assuredly reproducing the taught travel route and the direction.

Figure 13A:
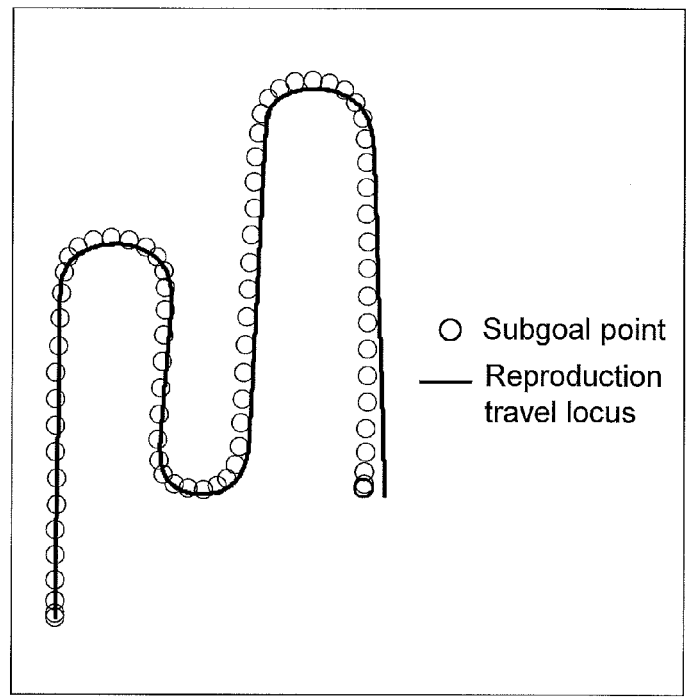
FIG. 13A is a diagram illustrating an example of a reproduction travel locus when the traveling speed correction is performed using a distance between the current subgoal point and the arrival target subgoal point as the required traveling distance.

Comparing with the locus in the Comparative Example 1 described later (the reproduction travel locus (FIG. 15A)), in which the autonomous travel vehicle 100 executes the reproduction travel without correcting the traveling speed, it is understood from FIG. 13A that the traveling speed correction described above enables the autonomous travel vehicle 100 to pass the subgoal points in the travel route data 500 more assuredly (i.e., to travel while more assuredly reproducing the taught travel route). FIG. 13A is a diagram illustrating an example of the reproduction travel locus when the traveling speed correction is performed by using the distance between the current subgoal point and the arrival target point subgoal point as the required traveling distance.

By correcting the traveling speed as described above, even if the travel route cannot be reproduced when the travel route data 500 is used without any corrections because the travel route data 500 has an error, the autonomous travel vehicle 100 of this preferred embodiment is able to travel while assuredly reproducing the taught travel route and the taught direction of the platform 1 (the autonomous travel vehicle 100).

Note that FIG. 12A illustrates an example in which the second current direction angle $\theta_{P2}$ indicating a direction of the platform 1 at the current position corresponds to the first current direction angle $\theta_{p1}$ associated with the current subgoal point $P_p$, but the traveling speed correction described above is able to be performed in the same manner even if the first current direction angle $\theta_{p1}$ is different from the second current direction angle $\theta_{P2}$.

(b) Case where Distance Between Current Position of Platform and Target Point to be Reached is Required Traveling Distance Next, with reference to FIG. 12B, there is described the traveling speed correction in the case where the distance between the current position P of the platform 1 and the target point to be reached is the required traveling distance $L_r$. In the example illustrated in FIG. 12B, there is described the traveling speed correction in the case where the platform 1 travels without changing its direction (namely, travels straight). However, without limiting to this, the correction described below can also be performed in the case where the platform 1 turns.

The traveling speed correction in the case where the distance between the current position P of the platform 1 and the target point to be reached is the required traveling distance $L_r$ is different from the traveling speed correction described above only in the point that the required traveling distance $L_r$ is the distance between the current position P of the platform 1 and the target point to be reached, and a basic concept of other portion is the same as the traveling speed correction described above.

The corrected speed calculator 7533 first determines the current position P of the platform 1 and the target point to be reached. The corrected speed calculator 7533 determines the current position P of the platform 1 based on the information about positions output from the position estimator 72.

In addition, the corrected speed calculator 7533 sets the subgoal point stored in the travel route data structure 500-($p$+1) next to the travel route data structure storing the arrival time corresponding to the current elapsed autonomous travel time (the travel route data structure 500-$p$ in the example illustrated in FIG. 12B) as the target point to be reached (the arrival target subgoal point $P_O$).

Next, the corrected speed calculator 7533 calculates the required traveling distance $L_r$ as the distance between the current position P of the platform 1 and the arrival target subgoal point $P_O$.

Then, the corrected speed calculator 7533 calculates the product of the current parallel speed component $V_{Cp}$ stored in the travel route data structure 500-$p$ and a ratio (third ratio) between the required traveling distance $L_r$ and the predicted traveling distance $L_e$ as the corrected parallel speed component $V_C'$.

In this preferred embodiment, the corrected speed calculator 7533 defines a distance between the predicted arrival position $P_O'$ and the arrival target subgoal point $P_O$ as Diff (positive value), and sets the value obtained by adding or subtracting the Diff to or from the predicted traveling distance $L_e$ as the required traveling distance $L_r$.

In the case described above, the corrected speed calculator 7533 adds Diff if the predicted arrival position $P_O'$ is before the arrival target subgoal point $P_O$ in the travel direction, while it subtracts Diff if the predicted arrival position $P_O'$ is ahead the arrival target subgoal point $P_O$.

In this way, if it is predicted that the predicted arrival position $P_O{}'$ is before the arrival target subgoal point $P_O$ in the travel direction as a result of traveling of the platform 1 (the autonomous travel vehicle 100) from the current position P at the traveling speed stored and included in the travel route data 500, the corrected speed calculator 7533 is able to calculate the corrected parallel speed component $V_C{}'$ so as to increase the traveling speed stored and included in the travel route data 500 (the current parallel speed component $V_{Cp}$).

On the other hand, if it is predicted that the predicted arrival position $P_O{}'$ is ahead the arrival target subgoal point $P_O$ (namely, the platform 1 has passed the arrival target subgoal point $P_O$), the corrected speed calculator 7533 is able to calculate the corrected parallel speed component $V_C{}'$ so as to decrease the traveling speed stored and included in the travel route data 500 (the current parallel speed component $V_{Cp}$).

Further, the correction of the turning speed component $V_R$ is performed in the same manner as the correction described above in the speed correction in the case where the distance between the subgoal points is the required traveling distance.

In this way, as illustrated in FIG. 12B, even if the current position P of the platform 1 (the autonomous travel vehicle 100) deviates from a position corresponding to the current subgoal point $P_p$, and/or if the predicted arrival position $P_O{}'$ deviates from a position corresponding to the arrival target subgoal point $P_O$, the deviation is able to be reduced before reaching the next target point (the arrival target subgoal point $P_O$).

Figure 13B:
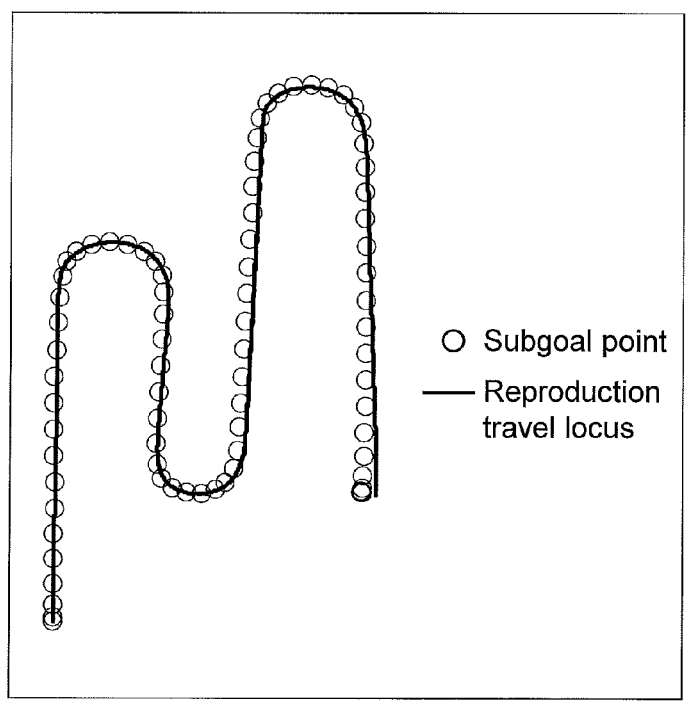
FIG. 13B is a diagram illustrating an example of the reproduction travel locus when the traveling speed correction is performed using a distance between the current position and the arrival target subgoal point as the required traveling distance.

As a result, as illustrated in FIG. 13B, error is not accumulated during traveling of the platform 1 (the autonomous travel vehicle 100). In other words, the autonomous travel vehicle 100 is able to travel with little error from the subgoal point also in a second half of the traveling. In this way, the platform (the autonomous travel vehicle 100) is able to travel while assuredly reproducing the taught travel route. FIG. 13B is a diagram illustrating an example of the reproduction travel locus when the traveling speed correction is performed using the distance between the current position and the arrival target subgoal point as the required traveling distance.

Note that if the current position P of the platform 1 deviates from the current subgoal point $P_p$, and if an angle between a line segment $PP_O{}'$ connecting the current position P and the predicted arrival position $P_O{}'$ and a line segment $P_pP_O$ connecting the current subgoal point $P_p$ and the arrival target subgoal point $P_O$ becomes a predetermined value or larger, the corrected speed calculator 7533 performs the speed correction by setting Diff to zero.

It is because the fact that the angle between the line segment $PP_O{}'$ and the line segment $P_pP_O$ becomes a predetermined value or larger means that the platform 1 (the autonomous travel vehicle 100) further deviates from the travel route if it autonomously travels at the corrected speed.

Note that it is possible to select one of the above-mentioned two correction methods as the traveling speed correction based on the required traveling distance $L_r$ and the predicted traveling distance $L_e$, based on a condition such as the current position P of the platform 1, a traveling state of the platform 1 (the autonomous travel vehicle 100), or the like.

(ii) Correction to Join Travel Route

Next, there is described the traveling speed correction such that the platform 1 (the autonomous travel vehicle 100) is able to join the travel route when the reproduction travel mode is executed and if the platform 1 (the autonomous travel vehicle 100) deviates from the planned travel route.

Figure 12C:
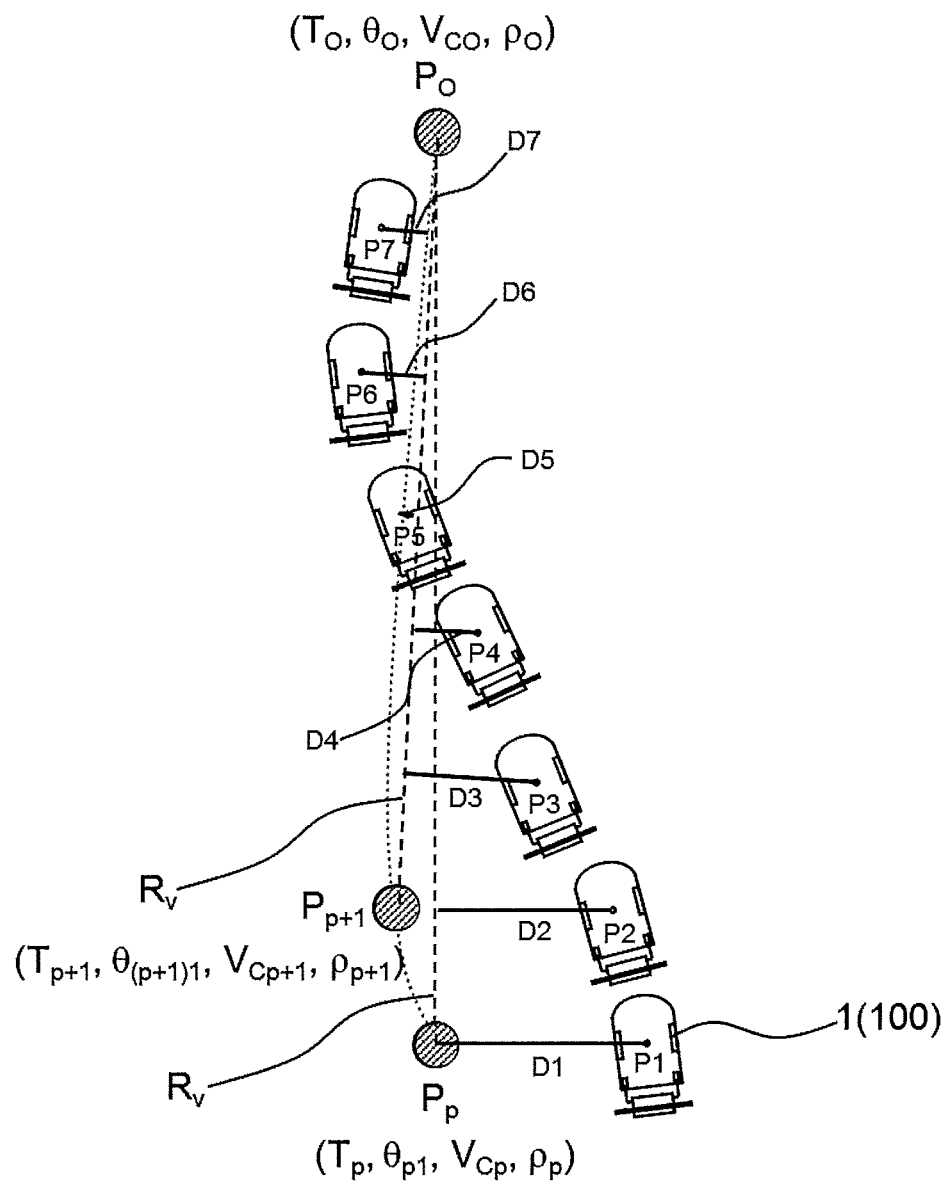
FIG. 12C is a diagram schematically illustrating traveling speed correction when a travel route error is a distance between a virtual travel route and the current position of the platform.
Figure 12D:
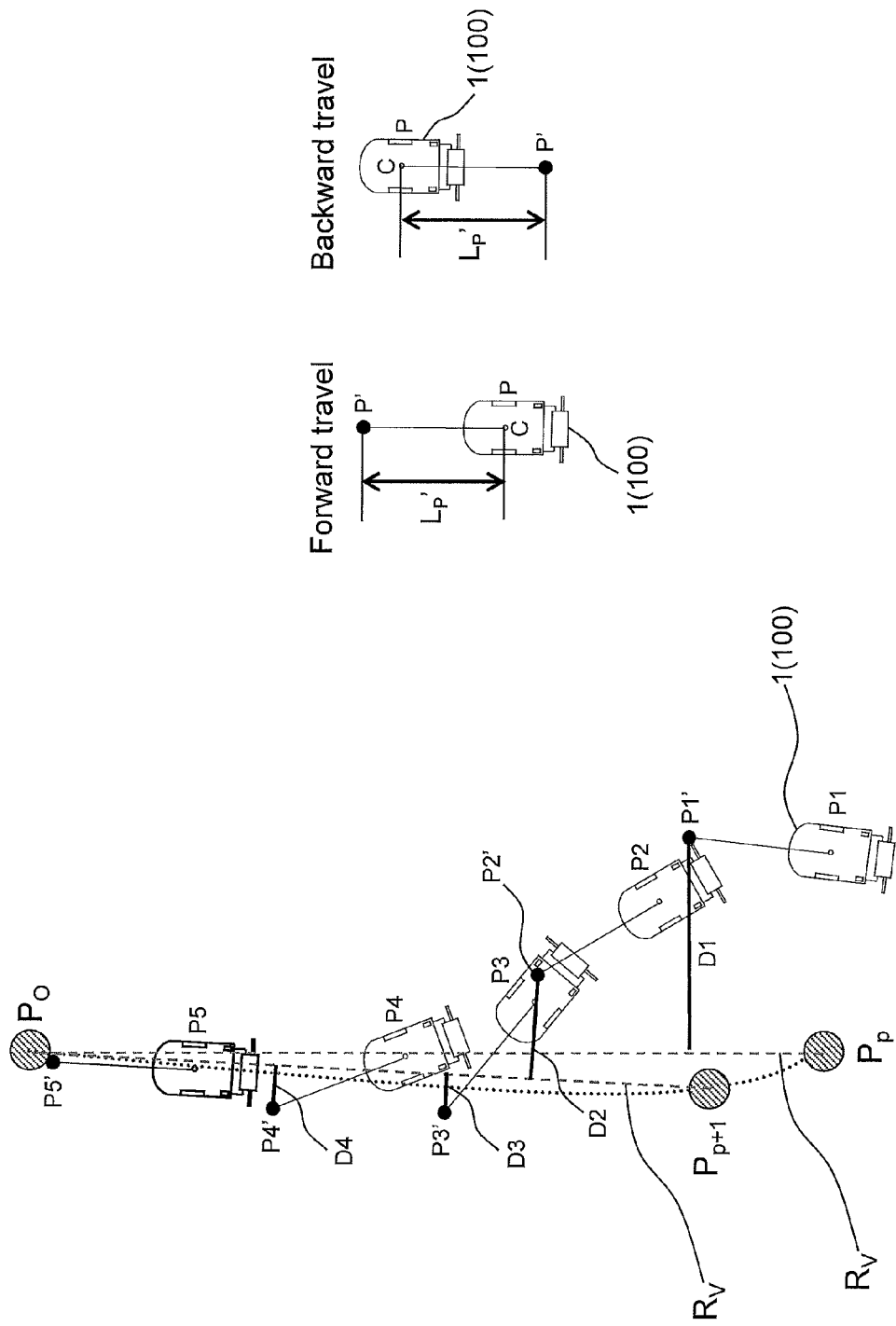
FIG. 12D is a diagram schematically illustrating traveling speed correction when the travel route error is a distance between the virtual travel route and a straight arrival prediction point.

In this preferred embodiment, the traveling speed correction to join the travel route is performed based on a travel route error D (described later) indicating a deviation between the platform 1 (the autonomous travel vehicle 100) and the travel route. In this preferred embodiment, there are two cases: one is a case in which a distance between a virtual travel route $R_V$ (described later) and the platform 1 (the autonomous travel vehicle 100) is used as the travel route error D as illustrated in FIG. 12C; and the other is a case in which a distance between the virtual travel route $R_V$ and a straight arrival prediction point P' (described later) is used as the travel route error D as illustrated in FIG. 12D. FIG. 12C is a diagram schematically illustrating the traveling speed correction in the case where the travel route error is the distance between the virtual travel route and the current position P of the platform 1. FIG. 12D is a diagram schematically illustrating the traveling speed correction in the case where the travel route error is the distance between the virtual travel route and the straight arrival prediction point. The cases are respectively described below.

(a) Case Where Travel Route Error is Distance between Virtual Travel Route and Current Position of Platform First, the traveling speed correction to join the travel route in the case where the travel route error D is the distance between the virtual travel route $R_V$ and the current position P of the platform 1 is described with reference to FIG. 12C.

Note that, when performing the traveling speed correction to join the travel route, the corrected speed calculator 7533 first calculates the corrected parallel speed component $V_C{}'$ and the corrected turning speed component $V_R{}'$ using the above-described traveling speed correction method based on the predicted traveling distance $L_e$ and the required traveling distance $L_r$.

Specifically, the distance between the current position P of the platform 1 and a subgoal point $P_{p+1}$ associated with a next arrival time $T_{p+1}$ is used as the required traveling distance $L_r$. In addition, a difference between the direction angle $\theta_{p+1}$ associated with the subgoal point $P_{p+1}$ and the second current direction angle $\theta_{P2}$ indicating the current direction of the platform 1 is used as the target direction angle change $\Delta\theta$.

Then, when the elapsed autonomous travel time becomes a time point corresponding to the next arrival time $T_{p+1}$, the corrected speed calculator 7533 calculates the corrected parallel speed component $V_C{}'$ and the corrected turning speed component $V_R{}'$ using the current subgoal point $P_p$ as the next subgoal point $P_{p+1}$ and using a current parallel speed component $V_{Cp+1}$ by the method described above.

For instance, in the case illustrated in FIG. 12C, the current subgoal point is switched from the subgoal point $P_p$ to the subgoal point $P_{p+1}$ when the current position of the platform 1 becomes a position P2.

In this way, every time the elapsed autonomous travel time becomes the time point corresponding to the arrival time, it is possible to approach the subgoal point associated with the arrival time as nearly as possible so as to join the travel route.

Next, the corrected speed calculator 7533 divides the corrected parallel speed component $V_C{}'$ into a first parallel speed component $V_{C1}$ and a second parallel speed component $V_{C2}$ at a predetermined ratio (namely, $V_C{}'=V_{C1}+V_{C2}$). As the predetermined ratio, an appropriate ratio is selected so that the autonomous travel vehicle 100 can travel forward or backward at a sufficient traveling speed and is able to quickly join the travel route.

In this way, a speed component that causes the autonomous travel vehicle 100 to join the travel route (namely, the travel route correction speed component) is able to be calculated without making the first traveling speed $V_1$ and/or the second traveling speed $V_2$ a maximum speed or higher, or a minimum speed or lower.

Next, the corrected speed calculator 7533 calculates a first travel route correction speed component $V_{C21}'$ and a second travel route correction speed component $V_{C22}'$ as corrected speeds joining the travel route respectively for the first traveling speed $V_1$ and the second traveling speed $V_2$ based on the travel route error D.

Specifically, the corrected speed calculator 7533 first calculates the travel route error D. Here, the travel route error D is supposed to be the distance between the virtual travel route $R_V$ and the current position P of the platform 1 (estimated from the information about positions in the position estimator 72). In addition, in this preferred embodiment, the virtual travel route $R_V$ is supposed to be a travel route expressed by a straight line connecting the current subgoal point $P_p$ and the arrival target subgoal point $P_O$ apart from the current subgoal point $P_p$ by a predetermined distance (the arrival target subgoal point $P_O$ is not limited to the next subgoal point $P_{p+1}$ as illustrated in FIG. 12C).

Because the virtual travel route $R_V$ is the straight line, the travel route correction speed components (the first travel route correction speed component $V_{C21}'$ and the second travel route correction speed component $V_{C22}'$) is able to be calculated by a simpler calculation.

Then, when the autonomous travel vehicle 100 is traveling forward, the corrected speed calculator 7533 sets the travel route error D as a negative value if the autonomous travel vehicle 100 exists on the right side of the travel route, while it sets the travel route error D as a positive value if the autonomous travel vehicle 100 exists on the left side of the travel route.

On the other hand, when the autonomous travel vehicle 100 is traveling backward, the corrected speed calculator 7533 sets the travel route error D as a positive value if the autonomous travel vehicle 100 exists on the right side of the travel route, while it sets the travel route error D as a negative value if the autonomous travel vehicle 100 exists on the left side of the travel route.

After calculating the travel route error D, the corrected speed calculator 7533 uses the second parallel speed component $V_{C2}$ so as to calculate the first travel route correction speed component $V_{C21}'$ and the second travel route correction speed component $V_{C22}'$. Specifically, the corrected speed calculator 7533 calculates the first travel route correction speed component $V_{C21}'$ as the product of the second parallel speed component $V_{C2}$ and a first constant $K_1$. Here, the first constant $K_1$ has a value determined by a function that monotonically increases in a range from 0 to 1 along with an increase of travel route errors D1, D2, and so on.

Figure 14:
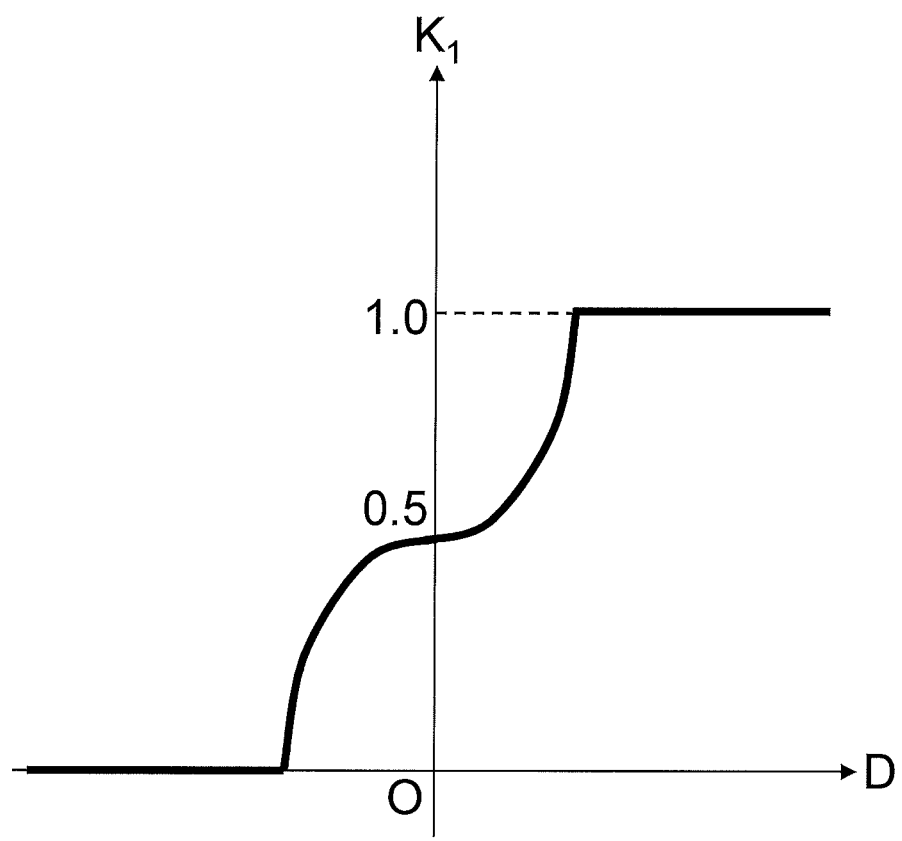
FIG. 14 is a diagram illustrating a graph of an example of a function that determines a first constant.

A function expressed by the graph illustrated in FIG. 14 is able to be used as the function described above, for example. FIG. 14 illustrates a graph of an example of the function that determines the first constant. A value of the function illustrated in FIG. 14 becomes about 0.5 when the travel route error D is zero, and it does not become smaller than zero or larger than one over the entire range of the travel route error D. In addition, the function illustrated in FIG. 14 is an upward convex parabola when the travel route error D has a negative value (when the autonomous travel vehicle 100 exists on the right side of the travel route in this preferred embodiment), while it is a downward convex parabola when the travel route error D has a positive value (when the autonomous travel vehicle 100 exists on the left side of the travel route in this preferred embodiment) (the function that determines the first constant increases monotonically).

The function that determines the first constant $K_1$ is not limited to including two parabolas as illustrated in FIG. 14. For instance, the function that determines the first constant $K_1$ may be a function expressing a straight line increasing monotonically along with an increase of the travel route error D (a straight line having a positive gradient with respect to the travel route error D). Alternatively, the function may be a cubic function of the travel route error D. The function is able to be appropriately determined depending on a turning degree given to the platform 1 (the autonomous travel vehicle 100) with respect to a value of the travel route error D.

On the other hand, the second travel route correction speed component $V_{C22}'$ is calculated as the product of the second parallel speed component $V_{C2}$ and a second constant $K_2$. Here, the second constant $K_2$ has a value determined by the difference between one and the first constant $K_1$ (namely, $K_2=1-K_1$).

Further, after the current subgoal point is switched from the subgoal point $P_p$ to the next subgoal point $P_{p+1}$ (the current position of the platform 1 becomes a position P3 and later in the case illustrated in FIG. 12C), the corrected speed calculator 7533 calculates the travel route error D using the straight line connecting the next subgoal point $P_{p+1}$ and the arrival target subgoal point $P_O$ as the new virtual travel route $R_V$.

After calculating the first travel route correction speed component $V_{C21}'$ and the second travel route correction speed component $V_{C22}'$, the corrected speed calculator 7533 calculates the first traveling speed $V_1$ and the second traveling speed $V_2$, by using a corrected parallel speed component $V_C''$ including the first travel route correction speed component $V_{C21}'$ or the second travel route correction speed component $V_{C22}'$ and the corrected turning speed component $V_R'$.

As described above, the corrected speed calculator 7533 calculates the first traveling speed $V_1$ and the second traveling speed $V_2$ including the first travel route correction speed component $V_{C21}'$ or the second travel route correction speed component $V_{C22}'$, and hence the first traveling speed $V_1$ and the second traveling speed $V_2$ further includes a speed difference corresponding to the difference between the first travel route correction speed component $V_{C21}'$ and the second travel route correction speed component $V_{C22}'$.

With the speed difference described above, in addition to the turning due to the corrected turning speed component $V_R'$, the platform 1 (the autonomous travel vehicle 100) is further driven to turn to join the travel route based on a value of the travel route error D.

In other words, when the travel route error D has a negative value (e.g., when the platform 1 is traveling forward and exists on the right side of the travel route), as to a relationship between the first travel route correction speed component $V_{C21}'$ and the second travel route correction speed component $V_{C22}'$, the first travel route correction speed component $V_{C21}'$ becomes smaller than the second travel route correction speed component $V_{C22}'$. It is because in this case, the first constant becomes smaller than about 0.5 (as a result, the second constant becomes larger than about 0.5). As a result, the platform 1 turns left (counterclockwise) in the travel direction (forward direction) (clockwise when traveling backward).

On the other hand, if the travel route error D has a positive value (e.g., when the platform 1 is traveling forward and exists on the left side of the travel route), as to a relationship between the first travel route correction speed component $V_{C21}'$ and the second travel route correction speed component $V_{C22}'$, the first travel route correction speed component $V_{C21}'$ is larger than the second travel route correction speed component $V_{C22}'$. It is because in this case, the first constant becomes larger than about 0.5 (as a result, the second constant becomes smaller than about 0.5). As a result, the platform 1 turns right (clockwise) in the travel direction (forward direction) (counterclockwise when traveling backward).

In addition, the speed difference between the first travel route correction speed component $V_{C21}'$ and the second travel route correction speed component $V_{C22}'$ becomes smaller as the travel route errors D1, D2, . . . become closer to zero. It is because when the travel route error D becomes close to zero, both the first constant and the second constant become close to about 0.5.

Accordingly, when the autonomous travel vehicle 100 becomes close to the original travel route, a turning amount of the autonomous travel vehicle 100 given by the difference between the first travel route correction speed component $V_{C21}'$ and the second travel route correction speed component $V_{C22}'$ becomes small (the curvature radius of the turning travel becomes large), and the turning amount becomes zero when the autonomous travel vehicle 100 has joined the travel route.

By determining the first constant and the second constant as described above, when the autonomous travel vehicle exists at a position deviating from the travel route and the autonomous travel vehicle autonomously joins the travel route, the corrected speed calculator 7533 is able to determine the turning to join the travel route based on the travel route error D and on which side of the travel route the platform 1 (the autonomous travel vehicle 100) exists (positive or negative of the travel route error D).

As a result, even if the autonomous travel vehicle 100 crosses the original travel route and over-travels to the opposite direction as illustrated in FIG. 12C after approaching the original travel route, the autonomous travel vehicle 100 is able to approach the travel route again. In this way, the autonomous travel vehicle 100 can gradually join the travel route.

(b) In Case Where Travel Route Error is Distance between Straight Arrival Prediction Point and Virtual Travel Route Next, with reference to FIG. 12D, there is described the traveling speed correction to join the travel route in the case where the travel route error is the distance between the straight arrival prediction point P' and the virtual travel route $R_V$.

The traveling speed correction to join the travel route illustrated in FIG. 12D is the same as the above-described traveling speed correction to join the travel route except that the travel route error is the distance between the straight arrival prediction point P' (described later) and the virtual travel route $R_V$.

The straight arrival prediction point P' is a point indicating a position that the platform 1 is predicted to reach when it travels straight while maintaining the current direction (direction angle) for a predetermined time. In this preferred embodiment, the straight arrival prediction point P' is predicted as a point apart from the center C of the platform 1 in the travel direction of the platform 1 by a predetermined distance $L_P'$, when the autonomous travel vehicle 100 travels forward, as illustrated in FIG. 12D.

On the other hand, when the autonomous travel vehicle 100 travels backward, the straight arrival prediction point P' is predicted as a point apart from the center C of the platform 1 in the backward travel direction of the platform 1 by a predetermined distance $L_P'$.

When using a distance between the straight arrival prediction point P' and the straight line connecting the current subgoal point $P_p$ and the arrival target subgoal point $P_O$ as the travel route error D, as illustrated in FIG. 12D, when the current position of the platform 1 becomes the position P3, the platform 1 exists on the right side of the travel route, while a straight arrival prediction point P3' exists on the left side of the travel route.

In other words, when the platform 1 (the autonomous travel vehicle 100) travels forward, for example, the arrival position predictor 7531 predicts that the platform 1 crosses the travel route and moves to the left side of the travel route if the platform 1 travels straight forward maintaining the direction at the position P3 when the platform 1 becomes close to the travel route and exists at the position P3.

In this case, the corrected speed calculator 7533 calculates the first travel route correction speed component $V_{C21}'$ and the second travel route correction speed component $V_{C22}'$, such that a magnitude relationship between the first travel route correction speed component $V_{C21}'$ and the second travel route correction speed component $V_{C22}'$ after the position P3 is reversed from the magnitude relationship before the position P3 (at the positions P1 and P2).

As a result, after the position P3, the platform 1 existing on the right side of the travel route is driven to turn right so as to travel along the travel route.

Accordingly, when the distance between the virtual travel route $R_V$ and the straight arrival prediction point P' is used as the travel route error D, the platform 1 (the autonomous travel vehicle 100) is able to join the travel route more quickly than a case where the distance between the virtual travel route $R_V$ and the current position P of the platform 1 is used. This is because of the following reason.

Figure 13C:
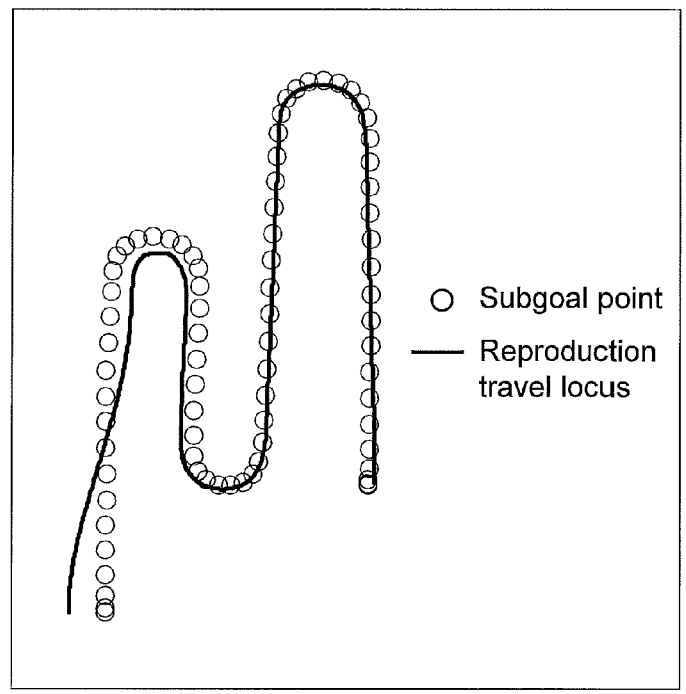
FIG. 13C is a diagram illustrating an example of the reproduction travel route when the travel route error is a distance between the virtual travel route and the current position of the platform.

In the case where the distance between the virtual travel route $R_V$ and the current position P of the platform 1 is used as the travel route error D, the magnitude relationship between the first travel route correction speed component $V_{C21}'$ and the second travel route correction speed component $V_{C22}'$ is reversed when the platform 1 crosses the travel route and reaches the side opposite to the side of the travel route on which it existed. Accordingly, as illustrated in FIG. 13C, the autonomous travel vehicle 100 crosses the travel route and then starts traveling in parallel to the travel route. FIG. 13C is a diagram illustrating an example of the reproduction travel route in the case where the travel route error is the distance between the virtual travel route and the current position of the platform.

In addition, there is also a case where the platform 1 (the autonomous travel vehicle 100) meanders with respect to the travel route so as to gradually approach the travel route. As a result, it takes time for the platform 1 to join the travel route.

On the other hand, in the case where the distance between the virtual travel route $R_V$ and the straight arrival prediction point P' is used as the travel route error D, the platform 1 (the autonomous travel vehicle 100) is driven to turn so as to travel along the travel route before crossing the travel route when the platform 1 (the autonomous travel vehicle 100) becomes close to the travel route by a certain degree.

Figure 13D:
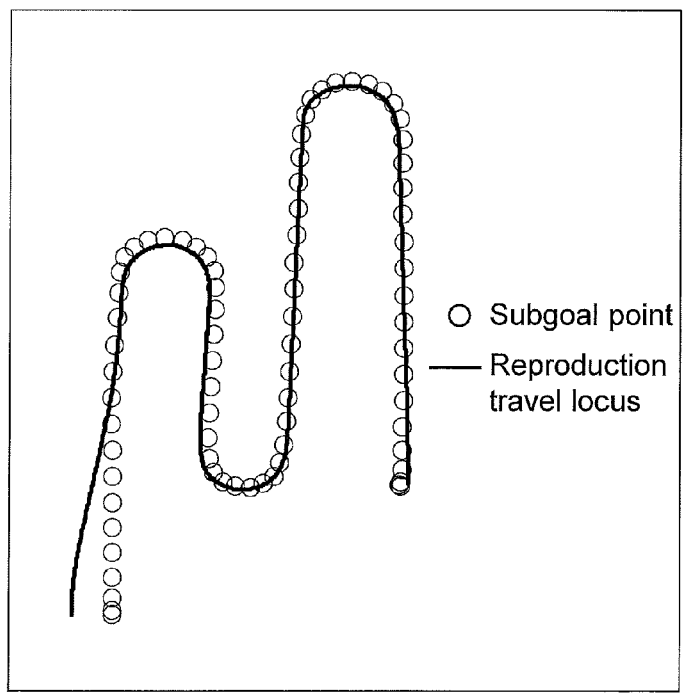
FIG. 13D is a diagram illustrating an example of the reproduction travel locus when the traveling speed is corrected using a distance between the virtual travel route and the straight arrival prediction point as the travel route error.

In this way, the platform 1 (the autonomous travel vehicle 100) hardly meanders with respect to the travel route (or the meandering disappears more quickly). As a result, as illustrated in FIG. 13D, the platform 1 (the autonomous travel vehicle 100) is able to quickly join the travel route without crossing the travel route or without meandering. FIG. 13D is a diagram illustrating an example of the reproduction travel locus when correcting the traveling speed using the distance between the virtual travel route and the straight arrival prediction point as the travel route error.

Comparative Example 1

Figure 15A:
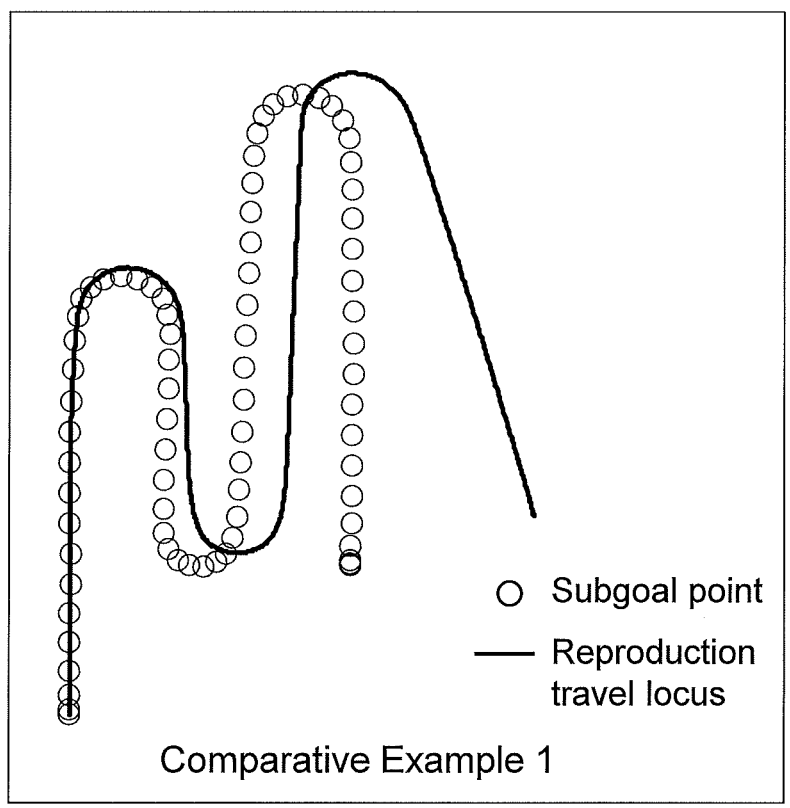
FIG. 15A is a diagram illustrating the reproduction travel locus in an example of executing the reproduction travel without correcting the traveling speed.

Here, in order to show an effect of the generation of the reproduction travel control command based on the corrected traveling speed obtained by correcting the traveling speed stored and included in the travel route data 500, the reproduction travel locus of Comparative Example 1 is illustrated in FIG. 15A, in which the autonomous travel vehicle 100 of the first preferred embodiment executes the reproduction travel without correcting the traveling speed stored and included in the travel route data 500 when the reproduction travel mode is executed. FIG. 15A is a diagram illustrating the reproduction travel locus in the example of the reproduction travel without correcting the traveling speed.

As illustrated in FIG. 15A, if the reproduction travel control command is calculated by using the traveling speed stored and included in the travel route data 500 without correcting the same, the autonomous travel vehicle 100 travels on the positions deviating from the travel route as the reproduction of the travel route proceeds.

Comparative Example 2

Figure 15B:
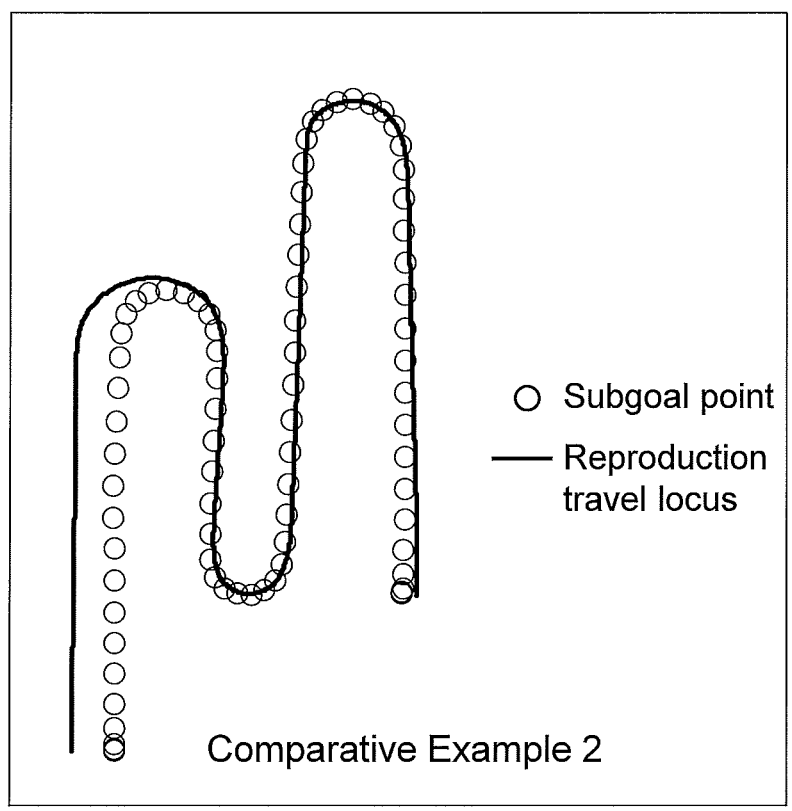
FIG. 15B is a diagram illustrating the reproduction travel locus in an example, which does not perform the traveling speed correction to join the travel route based on the travel route error.

Next, FIG. 15B illustrates the reproduction travel locus of Comparative Example 2, in which the autonomous travel vehicle 100 of the first preferred embodiment does not perform the traveling speed correction to join the travel route based on the travel route error.

As illustrated in FIG. 15B, if the position of the platform 1 (the autonomous travel vehicle 100) at start of the reproduction travel mode deviates from the travel route, and if the reproduction travel is performed without the traveling speed correction to join the travel route, the autonomous travel vehicle 100 executes the reproduction travel while maintaining an error between a position of the platform 1 (the autonomous travel vehicle 100) at start of the reproduction travel mode and the travel route (particularly in the first half of the travel route). Also in this case, it cannot be said that the autonomous travel vehicle 100 travels assuredly along the taught travel route.

Other Preferred Embodiments

Although the preferred embodiments of the present invention are described above, the present invention is not limited to the preferred embodiments described above but various modifications can be made within the scope of the present invention without deviating from the spirit thereof. In particular, a plurality of preferred embodiments and variations described in this specification can be arbitrarily combined as necessary.

In the autonomous travel vehicle 100 of the first preferred embodiment described above, the traveler 2 preferably is an opposed two-wheel differential type traveler including a pair of main wheels 21a and 21b capable of rotating independently of each other. However, the traveler 2 is not limited to the opposed two-wheel differential type traveler. For instance, the traveler 2 may be a traveler having an omni wheel.

In the autonomous travel vehicle 100 of the first preferred embodiment described above, the travel route data 500 preferably includes the direction angles θ. Without limiting to this, however, if the autonomous travel vehicle does not need to reproduce the directions, the travel route data 500 may not store the direction angles θ.

In the first preferred embodiment described above, the travel route data 500 preferably includes the traveling speeds. Without limiting to this, however, the travel route data 500 may not include the traveling speeds. In this case, the traveling speed is able to be calculated by using the subgoal points and the arrival times associated with the subgoal points stored and included in the travel route data 500. Further, if the directions of the platform 1 (the autonomous travel vehicle 100) are considered, the traveling speed (the parallel speed component and the turning speed component) can be calculated by further using the direction angle θ stored and included in the travel route data 500.

Preferred embodiments of the present invention can be widely applied to autonomous travel vehicles that autonomously travel while reproducing a specified travel route.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An autonomous travel vehicle comprising:
a platform;
a traveler including wheels that allow the platform to travel in accordance with a travel control command;
a storage that stores travel route data including a plurality of subgoal points set on a travel route, arrival times at which the platform reaches each of the plurality of subgoal points, and traveling speeds of the platform respectively at the plurality of subgoal points in association with each other;
an arrival position predictor that predicts a predicted arrival position based on a current position of the platform, a current traveling speed associated with a current subgoal point in the travel route data, a current arrival time, and a next arrival time associated with an arrival target subgoal point in the travel route data, when a reproduction travel mode is executed to cause the platform to autonomously travel along the travel route based on the travel route data;
the predicted arrival position being a position at which the platform is predicted to reach at the next arrival time during execution of the reproduction travel mode;
the current subgoal point corresponding to the current position of the platform;
the arrival target subgoal point corresponding to a target point to be reached by the platform;
a corrected speed calculator that calculates a corrected traveling speed, which is a corrected speed of the current traveling speed, based on a predicted traveling distance and a required traveling distance, when the reproduction travel mode is executed, the predicted traveling distance being a distance between the current position and the predicted arrival position, the required traveling distance being a distance that is necessary for the platform to reach the arrival target subgoal point; and
a reproduction travel command calculator that calculates a reproduction travel control command based on the corrected traveling speed as the travel control command, when the reproduction travel mode is executed.

2. The autonomous travel vehicle according to claim 1, wherein the required traveling distance is a distance between the current position of the platform and the arrival target subgoal point.

3. The autonomous travel vehicle according to claim 1, further comprising an elapsed autonomous travel time counter that counts an elapsed autonomous travel time from a start of the reproduction travel mode; wherein
the required traveling distance is a distance between the current subgoal point associated with an arrival time corresponding to the elapsed autonomous travel time and the arrival target subgoal point.

4. The autonomous travel vehicle according to claim 1, wherein
the wheels of the traveler include a pair of main wheels facing each other on left and right sides in a travel direction of the platform, the main wheels being capable of rotating independently of each other;
each of a first traveling speed and a second traveling speed includes a parallel speed component that determines a center speed of the platform and a turning speed component that determines turning of the platform, the first traveling speed and the second traveling speed being speeds of the pair of main wheels; and
the corrected speed calculator calculates a corrected parallel speed component that is a corrected speed of the parallel speed component and a corrected turning speed component that is a corrected speed of the turning speed component, as the corrected traveling speed.

5. The autonomous travel vehicle according to claim 4, wherein the corrected speed calculator further calculates the corrected parallel speed component including a travel route correction speed component that is a correction speed required to join the travel route based on a travel route error indicating a deviation between the travel route and the platform.

6. The autonomous travel vehicle according to claim 5, wherein the travel route error is a distance between the current position and a virtual travel route connecting the current subgoal point and the arrival target subgoal point.

7. The autonomous travel vehicle according to claim 5, wherein
the arrival position predictor further predicts a straight arrival prediction point that is reached by traveling straight from the current position; and
the travel route error is a distance between the straight arrival prediction point and a virtual travel route expressed by a straight line that connects the current subgoal point and the arrival target subgoal point.

8. The autonomous travel vehicle according to claim 5, wherein the corrected parallel speed component is divided into a first parallel speed component and a second parallel speed component at a predetermined ratio, and the travel route correction speed component is calculated by using the second parallel speed component.

9. The autonomous travel vehicle according to claim 8, wherein
a first travel route correction speed component that is the travel route correction speed component for the first traveling speed is calculated as a product of the second parallel speed component and a first constant determined by a function that monotonically increases in a range from 0 to 1 along with an increase of the travel route error; and
a second travel route correction speed component that is the travel route correction speed component for the second traveling speed is calculated as a product of the second parallel speed component and a second constant determined by a difference between 1 and the first constant.

10. The autonomous travel vehicle according to claim 4, wherein the travel route data further includes direction angles indicating directions of the platform respectively at the plurality of subgoal points, in association with the plurality of subgoal points.

11. The autonomous travel vehicle according to claim 10, wherein
the arrival position predictor further predicts a predicted direction angle indicating a direction at the predicted arrival position; and
the corrected speed calculator calculates the corrected turning speed component based on a target direction angle change and a predicted direction angle change, the target direction angle change being a change of an angle that is necessary to turn to an arrival target direction angle associated with the arrival target subgoal point, the predicted direction angle change being a difference between the predicted direction angle and a current direction angle indicating a direction of the platform at the current position.

12. The autonomous travel vehicle according to claim 4, wherein
the travel route data further includes travel curvature radii when the platform respectively passes the subgoal points, in association with respective ones of the subgoal points; and
the turning speed component is calculated based on the traveling speed corresponding to the parallel speed component and a travel curvature radius.

13. The autonomous travel vehicle according to claim 1, further comprising:
an elapsed teaching time counter that counts an elapsed teaching time when a manual operation teaching mode is executed to teach the travel route data via an operation of an operator, the elapsed teaching time being a time from start of the manual operation teaching mode; and
a taught data generator that generates the travel route data storing taught subgoal points on the travel route through the operation of the operator and elapsed teaching times when the taught subgoal points are obtained, in association with each other, when the manual operation teaching mode is executed.

* * * * *